US009326275B2

(12) United States Patent
Anbe

(10) Patent No.: US 9,326,275 B2
(45) Date of Patent: Apr. 26, 2016

(54) RADIO BASE STATION APPARATUS, RADIO COMMUNICATION METHOD IN RADIO BASE STATION APPARATUS, AND RADIO COMMUNICATION SYSTEM

(71) Applicant: FUJITSU LIMITED, Kawasaki-shi, Kanagawa (JP)

(72) Inventor: Michiko Anbe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/027,376

(22) Filed: Sep. 16, 2013

(65) Prior Publication Data

US 2014/0018120 A1 Jan. 16, 2014

Related U.S. Application Data

(63) Continuation of application No. PCT/JP2011/078586, filed on Dec. 9, 2011, which is a continuation of application No. PCT/JP2011/056448, filed on Mar. 17, 2011.

(51) Int. Cl.
*H04W 72/00* (2009.01)
*H04W 72/04* (2009.01)
*H04W 28/04* (2009.01)
*H04L 1/20* (2006.01)
(Continued)

(52) U.S. Cl.
CPC ............ *H04W 72/0406* (2013.01); *H04L 1/20* (2013.01); *H04W 28/048* (2013.01); *H04W 72/00* (2013.01); *H04W 84/12* (2013.01); *H04W 88/08* (2013.01)

(58) Field of Classification Search
CPC .......... H04W 28/048; H04W 42/0406; H04W 72/0406
USPC ........... 455/561, 509, 452.1, 452.2, 515, 434, 455/67.11, 67.13, 68
See application file for complete search history.

(56) References Cited

U.S. PATENT DOCUMENTS 6,628,639 B1 * 9/2003 Ishii .............................. 370/346
2002/0098870 A1 * 7/2002 Kashiwagi et al. ........... 455/561
(Continued)

FOREIGN PATENT DOCUMENTS

JP 10-13912 1/1998
JP 10-93529 4/1998
(Continued)

OTHER PUBLICATIONS

JPOA—Notification of Reason for Rejection issued for corresponding Japanese Patent Application No. 2013-504523 dispatched on Aug. 19, 2014 with partial English translation.
(Continued)

*Primary Examiner* — John J Lee
(74) *Attorney, Agent, or Firm* — Fujitsu Patent Center

(57) ABSTRACT

A radio base station apparatus for performing radio communication with a terminal apparatus by using a first and second radio frequency bands, the radio base station apparatus including a change unit which changes a radio frequency band for transmitting a control signal from the first radio frequency band to the second radio frequency band, when the change unit detects interference with respect to the control signal transmitted to the terminal apparatus; and a transmission unit which transmits the control signal by using the second radio frequency band.

13 Claims, 23 Drawing Sheets

(51) Int. Cl.
*H04W 84/12* (2009.01)
*H04W 88/08* (2009.01)

(56) References Cited

U.S. PATENT DOCUMENTS

| | | | |
|---|---|---|---|
| 2009/0323603 | A1 | 12/2009 | Kwon et al. |
| 2011/0038353 | A1 | 2/2011 | Miki |
| 2012/0069803 | A1 | 3/2012 | Iwamura et al. |

FOREIGN PATENT DOCUMENTS

| | | |
|---|---|---|
| JP | 2000-232464 | 8/2000 |
| JP | 2007-266990 | 10/2007 |
| JP | 2009-239537 | 10/2009 |
| JP | 2010-021794 | 1/2010 |
| JP | 2010-148012 | 7/2010 |
| JP | 2010-171885 | 8/2010 |

OTHER PUBLICATIONS

EESR—Extended European Search Report issued for corresponding European Patent Application No. 11861047.6, mailed Dec. 4, 2014.
Huawei; "Enhanced ICIC for control channels to support HetNet"; R1-103126; 3GPP TSG RAN WG1 meeting #61, Montreal, Canada, May 10-14, 2010.
3GPP TS 36.211 V10.0.0; 3rd Generation Partnership Project; "Evolved Universal Terrestrial Radio Access (E-UTRA); Physical channels and modulation (Release 10)", Dec. 2010.
3GPP TS 36.212 V10.0.0; 3rd Generation Partnership Project; "Evolved Universal Terrestrial Radio Access (E-UTRA); Multiplexing and channel coding (Release 10)", Dec. 2010.
3GPP TS 36.213 V10.0.1; 3rd Generation Partnership Project; "Evolved Universal Terrestrial Radio Access (E-UTRA); Physical layer procedures (Release 10)", Dec. 2010.
3GPP TS 36.331 V10.0.0; 3rd Generation Partnership Project; "Evolved Universal Terrestrial Radio Access (E-UTRA); Radio Resource Control (RRC); Protocol specification (Release 10)", Dec. 2010.
International search report issued for corresponding International Patent Application No. PCT/JP2011/056448, mailed Apr. 12, 2011.
International search report issued for corresponding International Patent Application No. PCT/JP2011/078586, mailed Mar. 6, 2012.
3rd Generation Partnership Project,Motorola; "Extension carrier operation"; R1-093973; 3GPP TSG RAN1 #58bis, Miyazaki, Japan, Oct. 12-16, 2009.

\* cited by examiner

| eNB ID | CARRIER | CELL ID | PDDCH PRIORITY CARRIER | LAST INTERFERENCE CALCULATION RESULT |
|---|---|---|---|---|
| #2 (My) | #3 | 1 | - | - |
|  | #4 | 2 | ○ | - |
|  | #5 | 3 | - | - |
| #1 | #3 | 4 | ○ |  |
|  | #4 | 5 | - |  |
|  | #5 | 6 | - |  |
| #3 | #3 | 7 | - |  |
|  | #4 | 8 | ○ |  |
|  | #5 | 9 | - |  |
| #4 | #3 | 10 | UNKNOWN |  |
|  | #4 | 11 |  |  |
|  | #5 | 12 |  |  |

| eNB ID | CA CELL | CARRIER | CELL ID | PDDCH PRIOR-ITY CARRIER | LAST INTERFERENCE CALCULATION RESULT |
|---|---|---|---|---|---|
| #2 (My) | #1 | #3 | 1 | - | - |
| | | #4 | 2 | ◯ | - |
| | | #5 | 3 | - | - |
| | #2 | #3 | 4 | - | |
| | | #4 | 5 | ◯ | |
| | | #5 | 6 | - | |
| #1 | #1 | #3 | 7 | ◯ | - |
| | | #4 | 8 | - | - |
| | | #5 | 9 | - | - |
| | #2 | #3 | 10 | ◯ | |
| | | #4 | 11 | - | |
| | | #5 | 12 | - | |

| eNB ID | CAR-RIER | CELL ID | HO WHITE | HO BLACK | PDDCH PRIOR-ITY CARRIER | LAST INTERFERENCE CALCULATION RESULT |
|---|---|---|---|---|---|---|
| #2 (My) | #3 | 1 | - | - | - | - |
| | #4 | 2 | - | - | ○ | - |
| | #5 | 3 | - | - | - | - |
| #1 | #3 | 4 | ○ | | ○ | |
| | #4 | 5 | ○ | | - | |
| | #5 | 6 | ○ | | - | |
| #3 | #3 | 7 | ○ | | - | |
| | #4 | 8 | ○ | | ○ | |
| | #5 | 9 | ○ | | - | |
| #4 | #3 | 10 | | ○ | UNKNOWN | |
| | #4 | 11 | | ○ | | |
| | #5 | 12 | | ○ | | |
| #5 | #3 | 13 | - | - | | |
| | #4 | 14 | - | - | | |
| | #5 | 15 | - | - | | |

| IE/GROUP NAME | PRESENCE | RANGE | SEMANTICS DESCRIPTION |
|---|---|---|---|
| MESSAGE TYPE | M | | |
| CELL INFORMATION | M | | |
| > CELL INFORMATION ITEM | | 1 to maxCellineNB | |
| >> CELL ID | M | | ID OF THE SOURCE CELL |
| >> CARRIER INFORMATION LIST | M | 1 to macCAs | |
| >>> CENTER ID | M | | ID OF THE CARRIER |
| >>> CENTER FREQUENCY | M | | |
| >>> BANDWIDTH | O | | |
| >>> PDCCH PRIOIRITY | M | | PRIORITY OF PDCCH ALLOCATION |

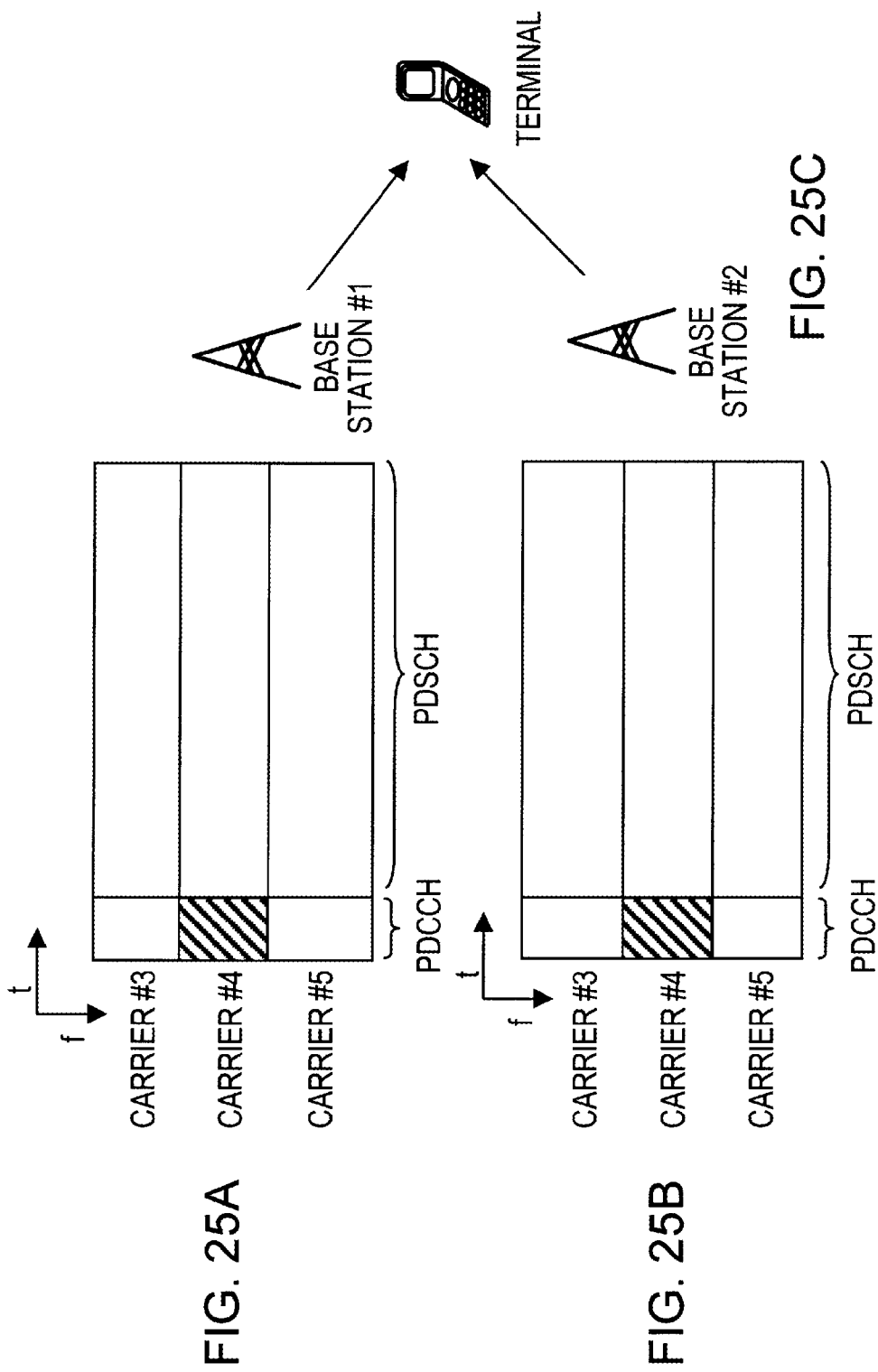

RADIO BASE STATION APPARATUS, RADIO COMMUNICATION METHOD IN RADIO BASE STATION APPARATUS, AND RADIO COMMUNICATION SYSTEM

CROSS-REFERENCE TO RELATED APPLICATIONS

This application is a continuation application of International Application PCT/JP2011/078586 filed on Dec. 9, 2011 and designated the U.S., the entire contents of which are incorporated herein by reference. This application is also a continuation application of International Application PCT/JP2011/056448 filed on Mar. 17, 2011, and designated the U.S., the entire contents of which are incorporated herein by reference. Further, it is noted that International Application PCT/JP2011/078586 is based upon and claims the benefit of priority from the prior International Patent Application PCT/JP2011/056448, filed on Mar. 17, 2011.

FIELD

The embodiments discussed herein are related to a radio base station apparatus, a radio communication method in a radio base station apparatus, and a radio communication system.

BACKGROUND

Nowadays, radio communication systems, such as a cellular phone system, a wireless LAN (Local Area Network) and the like, are widely used. Moreover, in the field of radio communication, next-generation communication technology is discussed continuously in order to further improve communication speed and channel capacity. As the next-generation communication technology, for example, LTE or LTE-Advanced standardization is completed or under way.

Some of the radio communication technology may establish radio communication between, for example, a radio base station apparatus (hereinafter referred to as a "base station") and a terminal apparatus (hereinafter referred to as a "terminal") by using a plurality of carriers. The radio communication established by using the plurality of carriers may be referred to as carrier aggregation. Incidentally, the carrier means one frequency band defined by a bandwidth and a center frequency, for example.

It is also possible for the base station to transmit a control signal to the terminal, for example, in the radio communication using the carrier aggregation. In this case, the control signal is transmitted by using a downlink control channel (PDCCH: Physical Downlink Control CHannel). Information about radio resources, information about a modulation and coding scheme (MCS: Modulation and Coding Scheme) and the like are contained in the control signal.

The information about the radio resources includes, for example, information of the radio resources (time and frequency, for example) allocated to an uplink shared channel (PUSCH: Physical Uplink Shared CHannel) and a downlink shared channel (PDSCH: Physical Downlink Shared CHannel) and the like. Further, the information about the modulation and coding scheme includes, for example, information about a coding rate and a modulation system with respect to a data signal (hereinafter referred to as "data") to be transmitted, information about a demodulation system and the coding rate with respect to the received data and the like.

The control signal is generated by the base station as needed. Based on the control signal transmitted from the base station, the terminal can receive and demodulate the data transmitted from the base station, and modulate the data and transmit it to the base station.

Meanwhile, when the base station establishes the radio communication by using the carrier aggregation, it transmits the control signal by using either one of the plurality of carriers. FIG. 25A and FIG. 25B are views respectively illustrating configuration examples of radio frames in a downlink direction. In this example, a base station #1 transmits the control signal by using a carrier #4, out of a carrier #3 to a carrier #5, and a base station #2 also transmits the control signal by using the carrier #4.

Incidentally, in the example of FIG. 25A and FIG. 25B, the radio base station #1 can transmit the data by using the three carriers (carrier #3 to carrier #5). In addition, the radio base station #2 can also transmit the data signal by using the three carriers (carrier #3 to carrier #5).

Moreover, FIG. 25C is a view illustrating a state where the control signal is transmitted from the two base stations #1 and #2 by using the radio frames formed according to FIG. 25A and FIG. 25B.

Non-Patent Literature 1: 3GPPTS 36.211 V10.0.0 (2010-12)
Non-Patent Literature 2: 3GPPTS 36.212 V10.0.0 (2010-12)
Non-Patent Literature 3: 3GPPTS 36.213 V10.0.1 (2010-12)
Non-Patent Literature 4: 3GPPTS 36.313 V10.0.0 (2010-12)

However, when the plurality of base stations use the same carrier and transmit the control signals, the control signals transmitted from the plurality of base stations may interfere with each other. In the example of FIG. 25A to FIG. 25C, for example, the two base stations #1 and #2 transmit the control signals by using the same carrier #4. At this time, for example, the control signal from the base station #1 and the control signal from the base station #2 may interfere with each other, and the terminal may be unable to receive the control signal from the base station #1. When the terminal is unable to receive the control signal transmitted from the base station #1, it can hardly receive the data transmitted from the base station #1 nor transmit the data to the base station #1. Namely, the terminal is unable to establish the radio communication with the base station #1.

Meanwhile, when the terminal establishes the radio communication with the base station #2, it is also possible that the terminal is unable to receive the control signal transmitted from the base station #2 due to interference of the control signal transmitted from the base station #1. In this case, it is difficult for the terminal to establish the radio communication with the base station #2, as the terminal is unable to receive the data transmitted from the base station #2 nor to transmit the data to the base station #2.

SUMMARY

According to an aspect of the embodiments, a radio base station apparatus for performing radio communication with a terminal apparatus by using a first and second radio frequency bands, the radio base station apparatus including a change unit which changes a radio frequency band for transmitting a control signal from the first radio frequency band to the second radio frequency band, when the change unit detects interference with respect to the control signal transmitted to the terminal apparatus; and a transmission unit which transmits the control signal by using the second radio frequency band.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 25A and FIG. 25B are views illustrating configuration examples of radio resources, and FIG. 25C is a view illustrating a state where a control signal is transmitted.

DESCRIPTION OF EMBODIMENTS

Hereinafter, embodiments will be explained in detail with reference to the drawings.

First Embodiment

Figure 1:
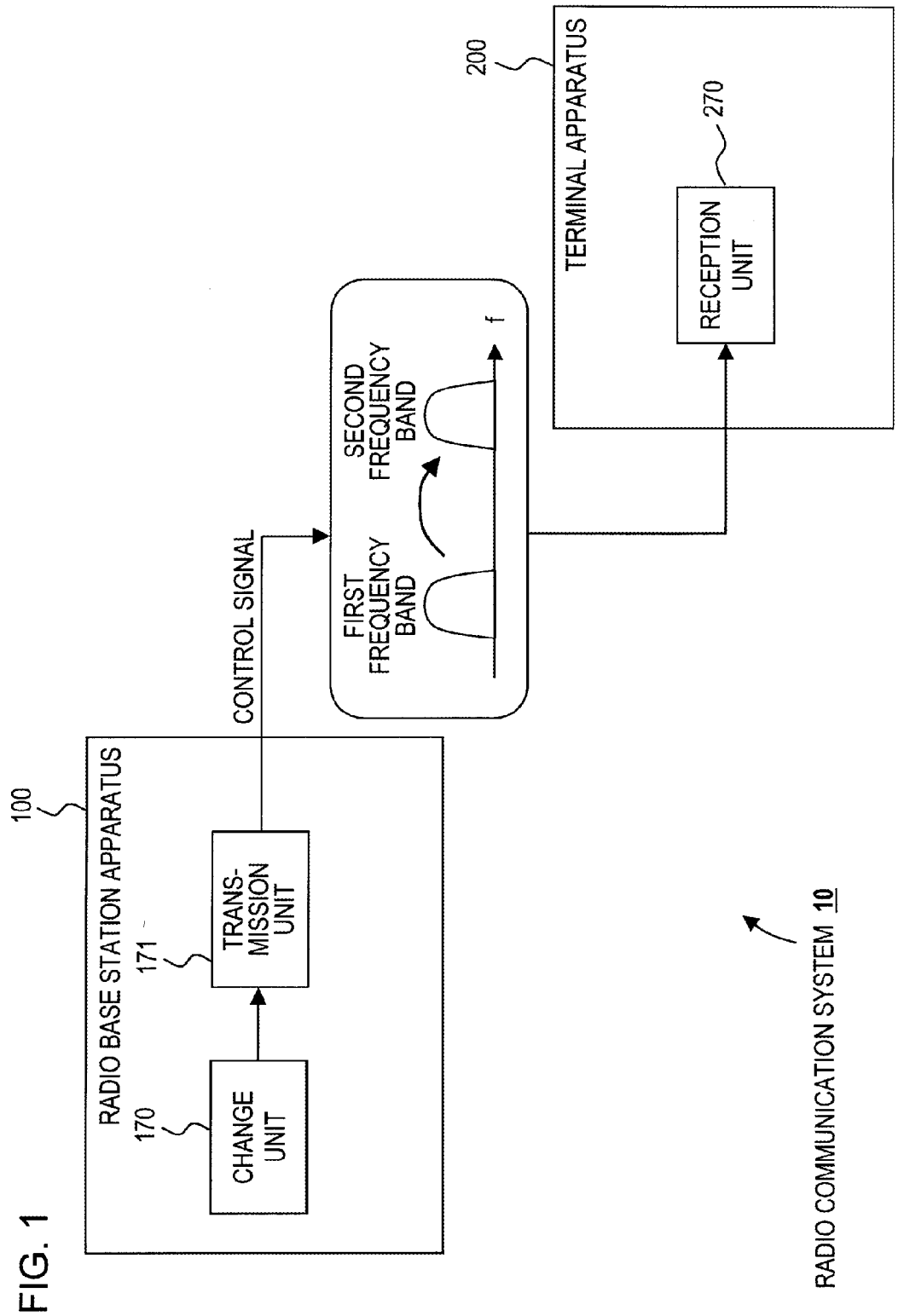
FIG. 1 is a view illustrating a configuration example of a radio communication system.

FIG. 1 is a view illustrating a configuration example of a radio communication system according to a first embodiment. A radio communication system 10 is provided with a radio base station apparatus 100 and a terminal apparatus 200. The radio base station apparatus 100 and the terminal apparatus 200 establish radio communication by using a first radio frequency band and a second radio frequency band. Although one terminal apparatus 200 is illustrated in the example of FIG. 1, a plurality of terminal apparatuses 200 may be provided.

The radio base station apparatus 100 includes a change unit 170 and a transmission unit 171. The change unit 170 changes a radio frequency band, for transmitting a control signal, from the first radio frequency band to the second radio frequency band, when an interference with respect to the control signal to be transmitted to the terminal apparatus 200 is detected. The transmission unit 171 transmits the control signal by using the second radio frequency band after the change.

Meanwhile, the terminal apparatus 200 is provided with a reception unit 270. The reception unit 270 receives the control signal by using the second radio frequency band.

Thus, when detecting the interference with respect to the control signal that is transmitted to the terminal apparatus 200, the radio base station apparatus 100 changes the radio frequency band, for transmitting the control signal, from the first radio frequency band to the second radio frequency band. Then, the radio base station apparatus 100 transmits the control signal over the second radio frequency band after the change. Therefore, the radio base station apparatus 100 avoids the interference by transmitting the control signal over the second radio frequency band, and the terminal apparatus 200 has a higher possibility of receiving the control signal than the case of using the first radio frequency band in which the interference is detected. Thus, the terminal apparatus 200 can receive the control signal and establish the radio communication with the radio base station apparatus 100 by using radio resource allocation information and the like.

Second Embodiment

Entire Configuration Example

Figure 2:
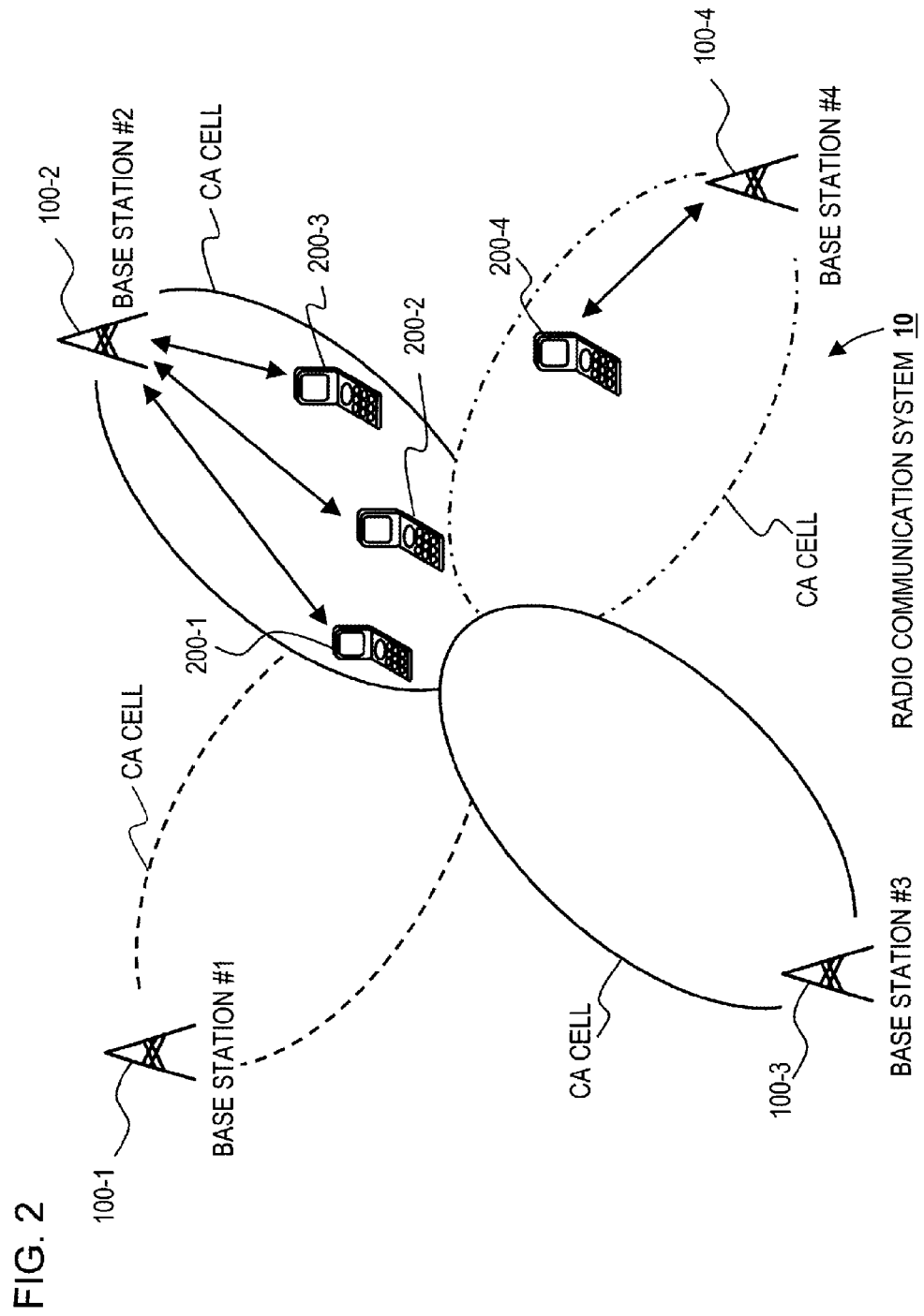
FIG. 2 is a view illustrating a configuration example of the radio communication system.

FIG. 2 is a view illustrating a configuration example of the radio communication system 10 according to a second embodiment. The radio communication system 10 is provided with radio base station apparatuses (hereinafter referred to as base stations) 100-1 to 100-4 and terminal apparatuses (hereinafter referred to as terminals) 200-1 to 200-4.

The base stations 100-1 to 100-4 are radio communication apparatuses that wirelessly connect with and establish the radio communication with the terminals 200-1 to 200-4. The base stations 100-1 to 100-4 can provide various services, such as voice communication, video distribution and the like, to the terminals 200-1 to 200-4.

Meanwhile, the terminals 200-1 to 200-4 are radio communication apparatuses that wirelessly connect with and establish the radio communication with the base stations 100-1 to 100-4, which may be, for example, cellular phones, information portable terminal apparatuses and the like. The terminals 200-1 to 200-4 can receive a data signal (hereinafter referred to as "data") from the base stations 100-1 to 100-4 and also transmit the data to the base stations 100-1 to 100-4.

In this DESCRIPTION, it is supposed that communication links from the base stations 100-1 to 100-4 to the terminals 200-1 to 200-4 is referred to as downlinks (DL: Down Link), and communication links from the terminals 200-1 to 200-4 to the base stations 100-1 to 100-4 is referred to as uplinks (UL: Up Link).

Here, the base stations 100-1 to 100-4 and the terminals 200-1 to 200-4 can establish the radio communication by using a plurality of carriers, for each of the downlinks and the uplinks. The carrier means one frequency band that is defined by, for example, a bandwidth and a center frequency, as described above. The radio communication established by using the plurality of carriers, for example, may be referred to as carrier aggregation, as described above.

Figure 3:
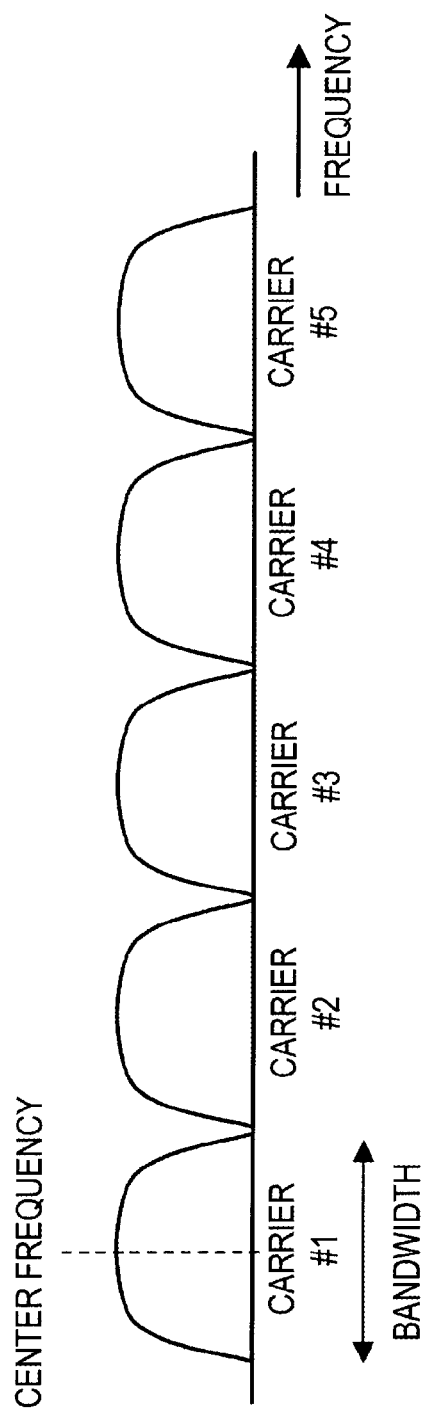
FIG. 3 is a view illustrating a setting example of carriers.

FIG. 3 is a view illustrating a setting example of the carriers when the carrier aggregation is performed. Five carriers are illustrated in an example of FIG. 3, and the radio communication is established by using these carriers. Further, in the radio communication system 10 that uses the carrier aggregation, the radio communication can be established by using the five carriers for each of the uplink and the downlink, for example. FIG. 3 illustrates the example of the carriers in the downlink, for example. The base stations 100-1 to 100-4 can transmit the data and the like by using one or a plurality of carriers out of the five carriers. Further, the base stations 100-1 to 100-4 can transmit the control signal by using either one carrier out of the five carriers.

Incidentally, although FIG. 3 illustrates an example of allocating the five carriers to continuous frequency bands, the carriers may be allocated to non-continuous frequency bands in both of the uplink and the downlink. In addition, any number, other than five, may be set as the number of the carriers, and the uplink and the downlink may have the different carrier numbers. For example, the uplink may have the five carriers, and the downlink may have the two carriers. Moreover, it is possible that the bandwidths of the respective carriers are not identical to each other.

Figure 7:
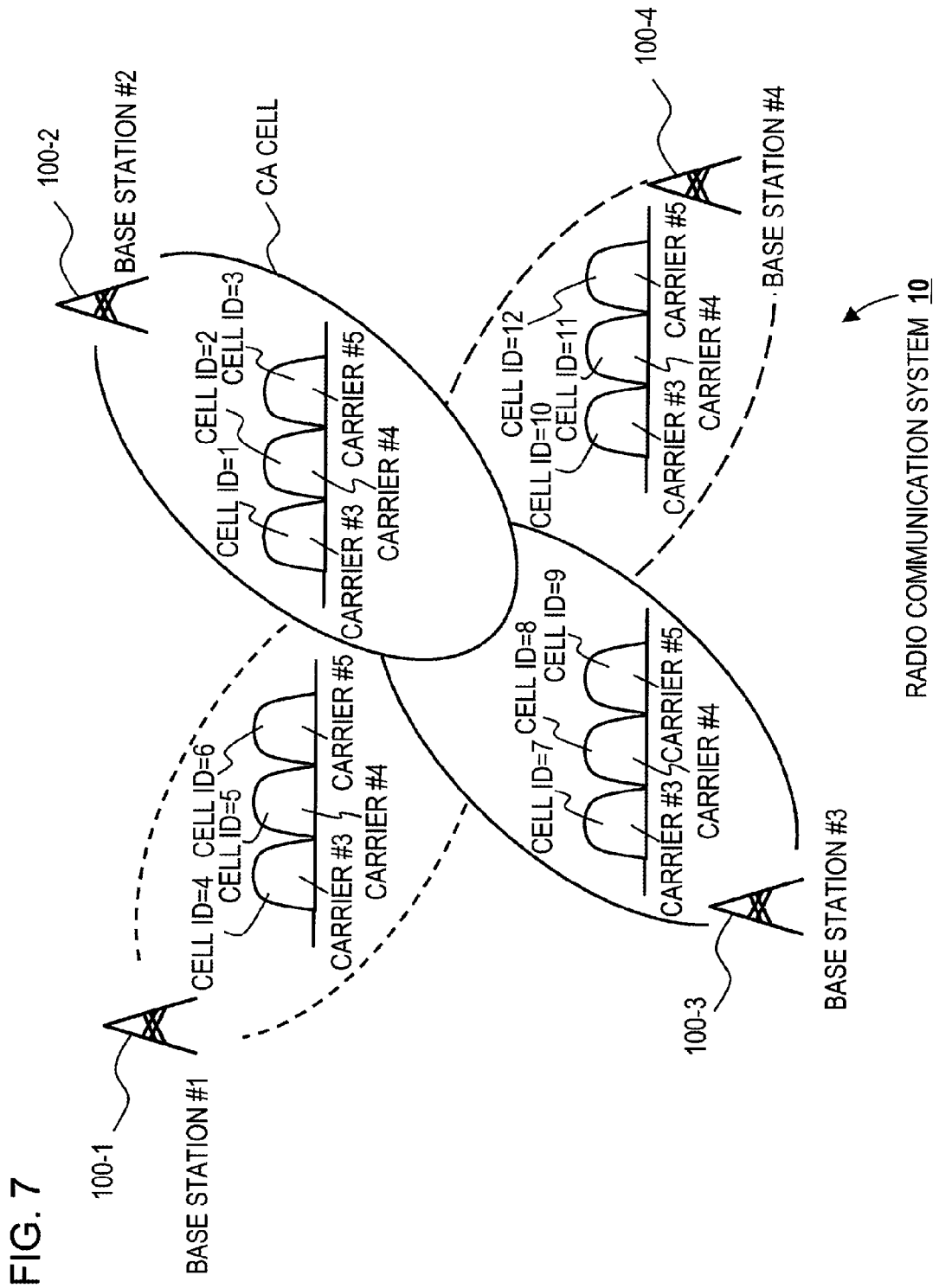
FIG. 7 is a view illustrating an example of relationship between the carriers and cells.

Although each of the base stations 100-1 to 100-4 has one or a plurality of CA cells, the radio communication system 10 in FIG. 2 illustrates an example in which each of the base stations 100-1 to 100-4 has one CA cell. The CA cell means aggregation of a plurality of cells that are arranged in an overlapping manner, for example, and the plurality of cells that are bound to each other (that are subjected to the carrier aggregation). FIG. 7 is a view illustrating an example of relationship between the carriers and the cells in the CA cells, in which the cells that are bound in each of the CA cells have the different carriers, and the respective cells are identified by unique cell IDs, as will be explained later in detail. Even when the carriers used in the respective CA cells are the same, for example, the cells in the different CA cells are different. In the example of FIG. 7, each of the two base stations 100-1 and 100-2 binds the same carriers #3 to #5, but the cell IDs for the respective carriers #3 to #5 are different from each other in the two base stations 100-1 and 100-2. Even when the carriers are the same, the cells are different when the cells are in the different CA cells.

<Configuration Example of Radio Base Station Apparatus>

Figure 4:
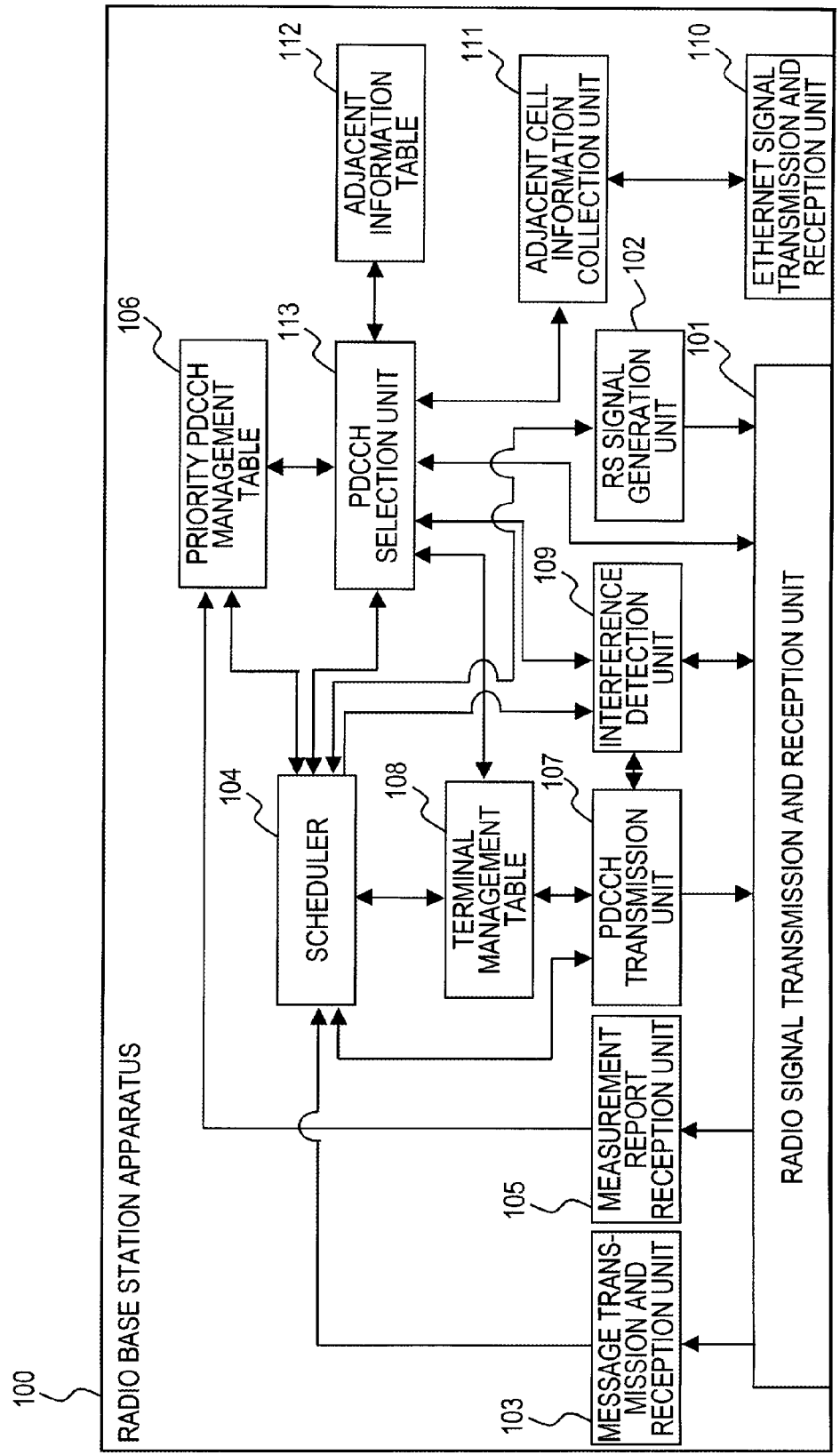
FIG. 4 is a view illustrating a configuration example of a radio base station apparatus.
Figure 5:
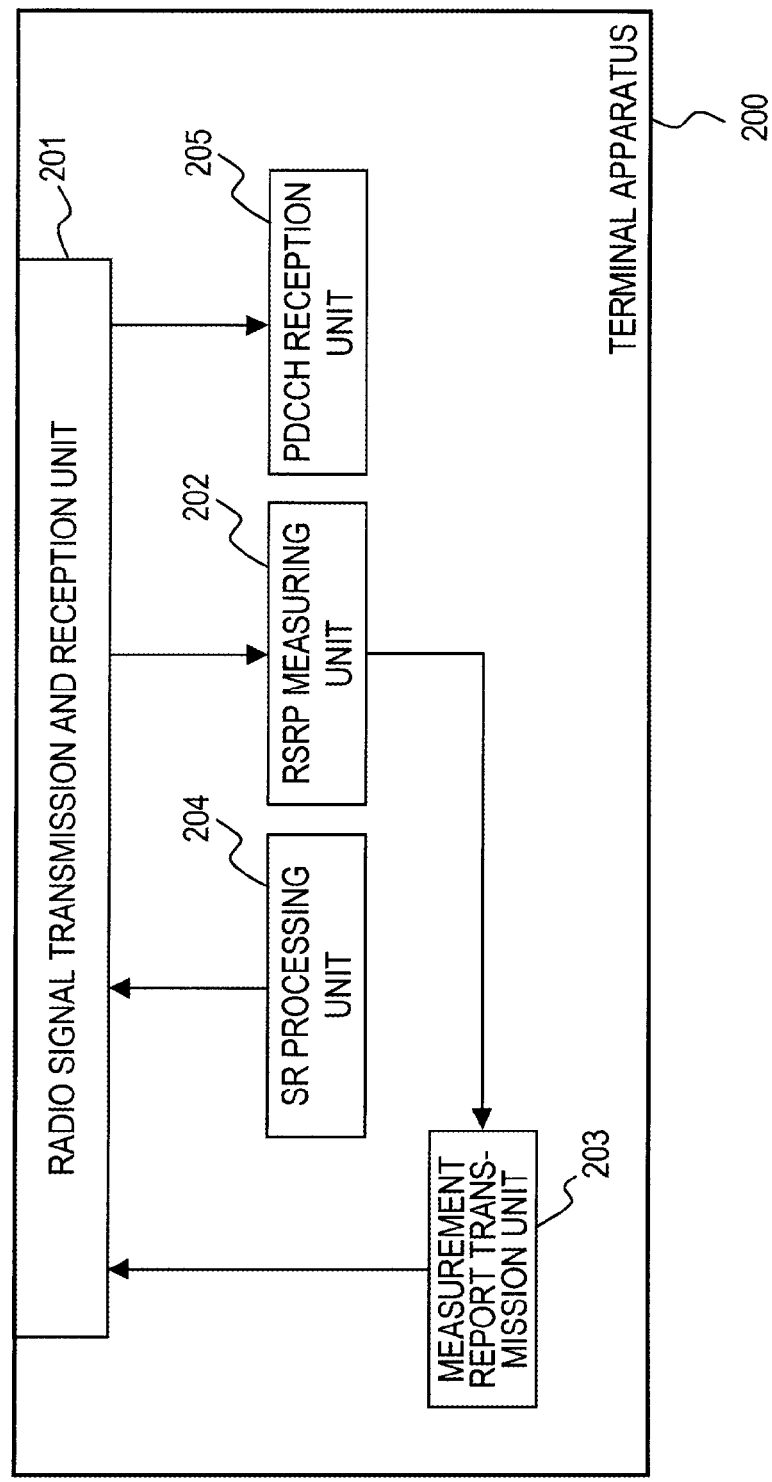
FIG. 5 is a view illustrating a configuration example of a terminal apparatus.

FIG. 4 and FIG. 5 are views illustrating configuration examples of the base station 100 and the terminal 200, respectively. Incidentally, all the base stations 100-1 to 100-4, as explained with FIG. 2, have the identical configuration, and an explanation will be given by regarding the base stations 100-1 to 100-4 as the base station 100, unless otherwise specified. In addition, the terminals 200-1 to 200-4 also have the identical configuration, and an explanation will be given by regarding these as the terminal 200, unless otherwise specified.

The base station 100 is provided with a radio signal transmission and reception unit 101, an RS signal (Reference Signal) generation unit 102, a message transmission and reception unit 103, a scheduler 104, a measurement report reception unit 105, a priority PDCCH management table 106, a PDCCH transmission unit 107, a terminal management table 108, an interference detection unit 109, an Ethernet (registered trademark) signal transmission and reception unit 110, an adjacent cell information collection unit 111, an adjacent information table 112, and a PDCCH selection unit 113.

Incidentally, the change unit 170 according to the first embodiment corresponds to the priority PDCCH management table 106, the terminal management table 108, and the PDCCH selection unit 113, for example. Further, the transmission unit 171 according to the first embodiment corresponds to the scheduler 104, the PDCCH transmission unit 107, and the radio signal transmission and reception unit 101, for example.

The radio signal transmission and reception unit 101 converts (up-converts) the reference signal outputted from the RS signal generation unit 102 and the control signal outputted from the PDCCH transmission unit 107 into a radio signal, and transmits the radio signal to the terminal 200. Further, the radio signal transmission and reception unit 101 receives the radio signal transmitted from the terminal 200, converts (down-converts) it into a baseband signal, and outputs the baseband signal to the message transmission and reception unit 103, the measurement report reception unit 105, and the interference detection unit 109. The radio signal transmission and reception unit 101 is provided with an A/D (Analog/Digital) conversion circuit, a D/A conversion circuit, a frequency converter, a band pass filter (BPF: Band Pass Filter) and the like, in order to perform the above-described conversion.

The RS signal generation unit 102 generates the reference signal, and outputs the generated reference signal to the radio signal transmission and reception unit 101. The reference signal is used, for example, when the terminals 200 establishes synchronization with the base station 100, performs cell search, or the like. According to this embodiment, the reference signal is used in measuring an RSRP (Reference Signal Received Power) and the like in the terminal 200.

The message transmission and reception unit 103 extracts a message from the baseband signal outputted from the radio signal transmission and reception unit 101. For example, the message transmission and reception unit 103 receives a scheduling request (SR: Scheduling Request) signal transmitted from the terminal 200, and outputs the scheduling request to the scheduler 104.

Based on the scheduling request, the scheduler 104 allocates radio resources, with regard to a physical uplink shared channel (PUSCH) and a physical downlink shared channel (PDSCH), to the terminal 200, and determines a modulation and coding scheme (MCS), and the like. The scheduler 104 outputs such radio resource allocation information, modulation and coding scheme and the like to the PDCCH transmission unit 107 as scheduling information, and instructs the PDCCH transmission unit 107 to generate the control signal containing the scheduling information. It is also possible for the scheduler 104 to output information about which of the plurality of carriers is used to transmit the control signal (hereinafter referred to as a "PDCCH transmission carrier") to the PDCCH transmission unit 107, for example. At this time, the scheduler 104 can read out information about the PDCCH transmission carrier by referring to, for example, the priority PDCCH management table 106 or the terminal management table 108.

The measurement report reception unit 105 extracts a measurement report from the baseband signal outputted from the radio signal transmission and reception unit 101. As the measurement report is transmitted from the terminal 200 by using the radio resource of the physical uplink shared channel (PUSCH) scheduled in the base station 100, for example, the measurement report can be extracted based on the scheduling information from the scheduler 104. The measurement report reception unit 105 detects whether the base station or the CA cell is an interference source or not, based on the RSRP contained in the extracted measurement report, for example. When detecting that the base station or the CA cell is the base station or the CA cell as the interference source (hereinafter referred to as a "base station as the interference source"), the measurement report reception unit 105 performs such processing as to add a new entry to the priority PDCCH management table 106. It is also possible for the measurement report reception unit 105 to calculate the latest interference based on the RSRP contained in the extracted measurement report, and to store the calculation result in the priority PDCCH management table 106.

Figure 6:
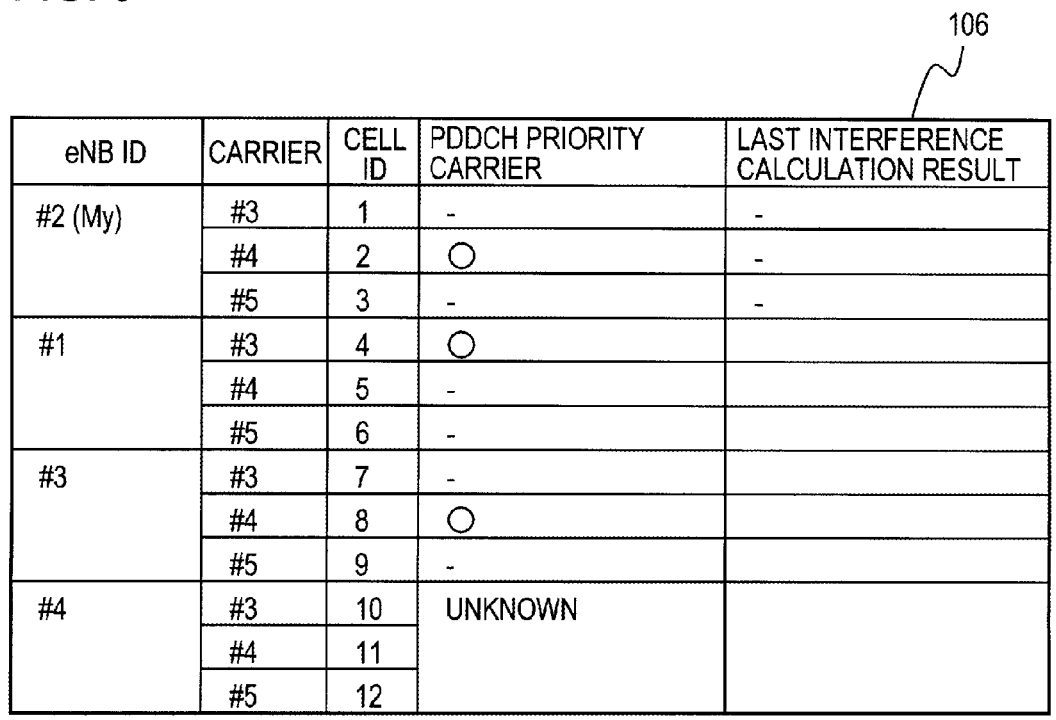
FIG. 6 is a view illustrating an example of a priority PDCCH management table.

The priority PDCCH management table 106 is, for example, a table for managing the base station as the interference source with respect to the terminal 200 connected to its own station. FIG. 6 is a view illustrating a configuration example of the priority PDCCH management table 106. The priority PDCCH management table 106 includes items of "eNB ID", "Carrier", "Cell ID", "PDCCH priority carrier", and "Last interference calculation result".

In the item of the "eNB ID", an ID of the base station for identifying the base stations 100-1 to 100-4 (hereinafter referred to as an "eNB ID") is registered. In the item of the "eNB ID", for example, the eNB ID of the base station as the interference source with respect to the terminal 200 is registered, as described above. Thus, the eNB ID of the base station as a handover target of the terminal 200 may be registered, but the base station other than the handover target of the terminal 200 may also be registered, and the base station as the interference source may be registered in the item of the "eNB ID". Incidentally, unless otherwise specified herein, the "registration" includes storage of a value in the corresponding item in the various tables 106, 108 and 112 that are stored in a memory or the like, for example.

In the item of the "Carrier", the number of the carrier used for the radio communication in the base stations 100-1 to 100-4 is stored. In the example of FIG. 6, the carrier numbers of the carriers #3 to #5 are registered in the respective base stations 100-1 to 100-4, and thus the base stations 100-1 to 100-4 can establish the radio communication of the downlink by using the carrier #3 to the carrier #5, for example.

In the item of the "Cell ID", the cell ID is registered. As described above, the cell ID is an ID uniquely allocated to each of the cells, and the different cell IDs are allocated to the cells that are in the different CA cells, even though the cells have the same carrier. For example, which carrier is used in which CA cell in the base stations 100-1 to 100-4 is uniquely decided by the cell ID. Although each of the base stations 100-1 to 100-4 has one CA cell and there is no need to identify the CA cell by the cell ID in the example of FIG. 6, the cell ID "1" corresponds to the carrier #3 in the base station 100-2, and the cell ID "7" corresponds to the carrier #3 in the base station 100-3.

Now, a further explanation will be given to the cell ID. FIG. 7 is the view illustrating an example of relationship between the carriers and the cells in the respective base stations 100-1 to 100-4, which corresponds to the priority PDCCH management table 106 in FIG. 6. In the CA cell of the base station 100-2, for example, the carriers from the carrier #3 to the carrier #5 are used, and the cell IDs "1" to "3" are allocated to the carrier #3 to the carrier #5, respectively. In other base stations 100-1, 100-3 and 100-4, the cell IDs "4" to "12" are allocated to the carriers used in the respective base stations 100-1, 100-3 and 100-4. As described above, the different cell IDs are allocated to the cells that are in the different CA cells, even though the cells have the same carrier.

Such cell IDs are allocated by a higher-level apparatus of the base station 100, for example, and can be collected from the higher-level apparatus by the adjacent cell information collection unit 111. Alternatively, the adjacent cell information collection unit 111 may collect the cell IDs of other base stations, and the PDCCH selection unit 113 may allocate the cell IDs that are free. Incidentally, the eNB ID, allocated by the higher-level apparatus, may also be collected by the adjacent cell information collection unit 111 and registered in the priority PDCCH management table 106, or the eNB ID may be generated from the cell IDs after the cell IDs are allocated by the PDCCH selection unit 113. In the latter case, for example, the PDCCH selection unit 113 may generate the eNB ID by selecting the eNB ID from a plurality of eNB ID candidates, including the cell IDs.

Back to FIG. 6, in the item of the "PDCCH priority carrier", the number of the carrier that is used when the base station 100 transmits the control signal over the PDCCH (hereinafter referred to as a "PDCCH priority carrier") is stored. Incidentally, the carrier used by the base station 100 to transmit the control signal to all subordinate terminals may be referred to as the PDCCH priority carrier, or the carrier used to transmit the control signal to each of the terminals may be referred to as the PDCCH transmission carrier, for example. Focusing on each of the terminals, the PDCCH transmission carrier may be the PDCCH priority carrier, or there is a case where the PDCCH transmission carrier is not the PDCCH priority carrier, the details of which will be explained later.

The PDCCH priority carrier of its own station can be determined in advance at the time of installing the base station 100, for example, and can be stored in the item of the "PDCCH priority carrier" at the time of generating the priority PDCCH management table 106 and the like. Further, it is also possible for the adjacent cell information collection unit 111 to collect the PDCCH priority carriers of other base stations 100-1, 100-3 and 100-4, periodically from other base stations 100-1, 100-3 and 100-4. Thus, the PDCCH priority carriers of other base stations can be stored in the priority PDCCH management table 106. FIG. 6 illustrates an example of transmitting the control signal by using the carrier #4, the carrier #3, and the carrier #4 by the base station (#2) 100-2, the base station (#1) 100-1, and the base station (#3) 100-3, respectively. "Unknown" in FIG. 6 means that the PDCCH priority carrier is not clear as the base station is of another company, for example, even though the PDCCH priority carrier is collected periodically.

In the item of the "Last interference calculation result", for example, a difference value between a received power in the CA cell of its own station and a received power in the adjacent CA cell of another base station is stored. Such calculation is made by the measurement report reception unit 105, for example, and the calculation result is stored in the item of the "Last interference calculation result". The example of FIG. 6 illustrates the state where the calculation result is not yet stored in the item of the "Last interference calculation result". Details of the calculation will be explained later.

Figure 8:
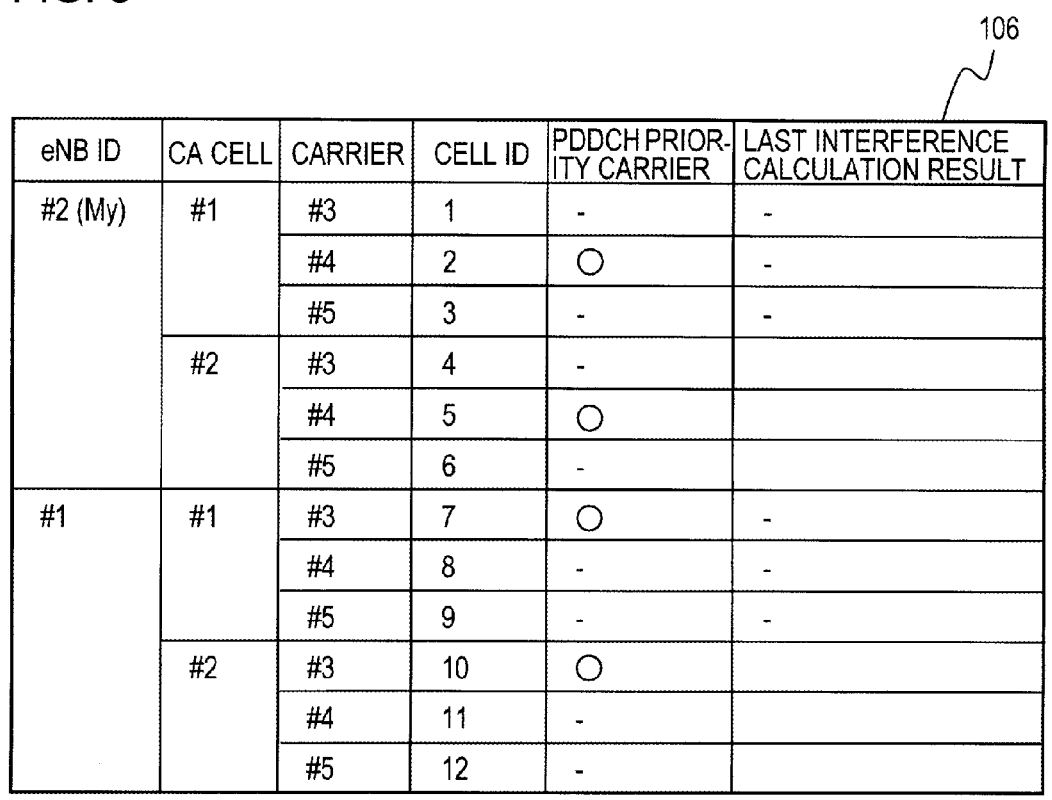
FIG. 8 is a view illustrating an example of the priority PDCCH management table.
Figure 9:
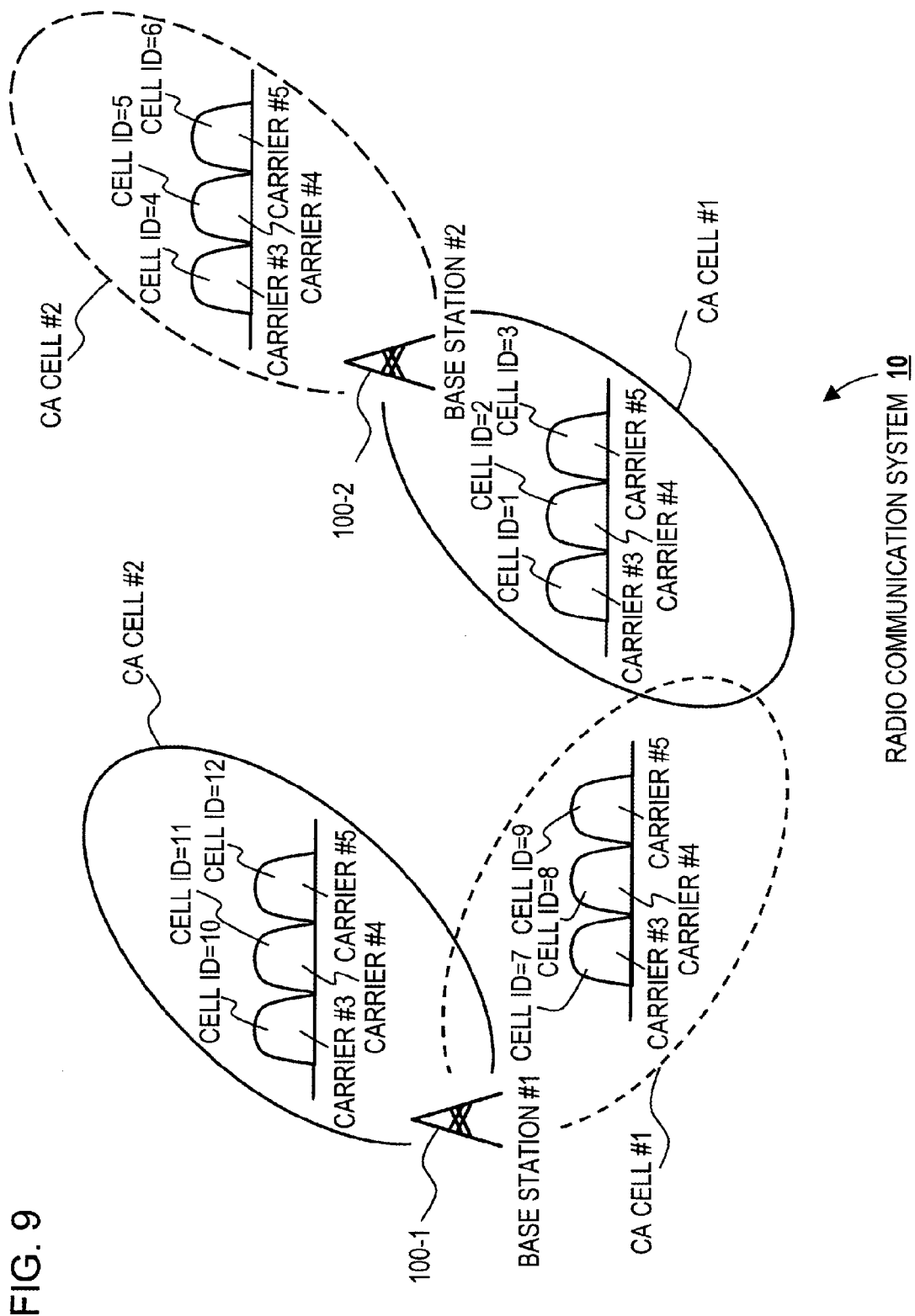
FIG. 9 is a view illustrating an example of relationship between the carriers and the cells.

Incidentally, FIG. 6 and FIG. 7 illustrate an example in which each of the base stations 100-1 to 100-4 has one CA cell. Each of the base stations 100-1 to 100-4 may have a plurality of CA cells, for example. FIG. 8 illustrates a configuration example of the priority PDCCH management table 106, and FIG. 9 illustrates an example of relationship between the carriers and the cells in the respective base stations 100-1 and 100-2, respectively, in the case where each of the base stations 100-1 and 100-2 has the two CA cells.

In the base station 100-2, for example, the CA cell IDs (CA cell #1 and CS cell #2) are allocated to the two CA cells, respectively. Further, in the base station (#2) 100-2, cell IDs "1" to "3" are allocated to carriers #3 to #5 that are used in the CA cell #1, and different cell IDs "4" to "6" are allocated to the carriers #3 to #5 that are used in the CA cell #2, respectively. In the base station 100-1 (#1), respective cell IDs are also allocated to the carriers that are used in the two CA cells. Thus, in the case where each of the base stations 100-1 to 100-4 has the plurality of CA cells, the different cell IDs are allocated to the cells that are in the different CA cells, even though the cells have the same carrier number. The eNB ID, the CA cell, and the carrier number are uniquely decided by the cell ID.

Back to FIG. 4, the PDCCH transmission unit 107 receives the instruction from the scheduler 104 to generate the control signal, and then generates the control signal containing the scheduling information received from the scheduler 104. The PDCCH transmission unit 107 transmits the generated control signal via the radio signal transmission and reception unit 101 to the terminal 200, by using the PDCCH. The PDCCH transmission unit 107 transmits the control signal to the terminal 200 according to carrier information for transmitting the control signal, such as the PDCCH priority carrier, received from the scheduler 104, for example. In the example of FIG. 6, for example, the PDCCH transmission unit 107 transmits the control signal by using the carrier #4. For this reason, it is also possible for the PDCCH transmission unit 107 to control the radio signal transmission and reception unit 101 so as to transmit the control signal over the PDCCH priority carrier, for example. Alternatively, it is also possible for the PDCCH transmission unit 107 to read out the information of the carrier for transmitting the control signal, such as the PDCCH priority carrier, stored in the terminal management table 108, and to transmit the control signal over this carrier.

Figure 10:
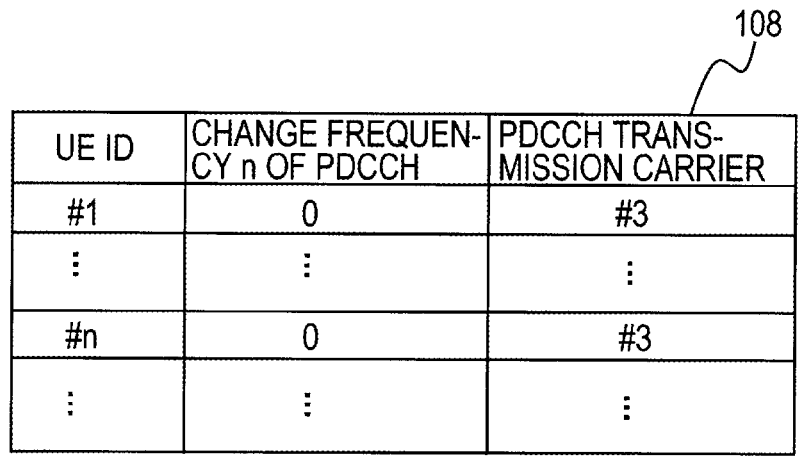
FIG. 10 is a view illustrating an example of a terminal management table.

Back to FIG. 4, the terminal management table 108 stores the number of times when the PDCCH priority carrier is changed for each of the terminals 200, in the respective subordinate terminals 200. FIG. 10 is a view illustrating an example of the terminal management table 108. FIG. 10 illustrates the example of the terminal management table 108 that stores information including identification information of the terminal 200 ("UE ID"), a change frequency of the PDCCH, and the PDCCH transmission carrier. According to this embodiment, the base station 100 changes the PDCCH priority carrier when it detects occurrence of the interference, as will be explained later in an operation example. At the time of the initial change, the base station 100 changes the PDCCH priority carrier itself, and at the second and subsequent changes, the base station 100 does not change the PDCCH priority carrier, but changes the PDCCH transmission carrier for transmitting the control signal to the respective terminals 200. The base station 100 registers the change frequency in the terminal management table 108 in order to distinguish the processing that depends on the change frequency, for example. Further, when the "PDCCH transmission carrier" is stored in the terminal management table 108, the PDCCH priority carrier that is set initially is stored when there is no change, for example, the PDCCH priority carrier after the change is stored upon the first change, and the PDCCH transmission carrier after the change, which is changed for each of the terminals 200, is stored upon the second and subsequent changes.

Back to FIG. 4, the interference detection unit 109 receives the scheduling request (SR) from the terminal 200, transmits the control signal, and thereafter detects whether the interference is caused or not based on presence/absence of the radio signal received from the terminal 200. Details of the interference detection will be explained later. The interference detection unit 109 can output the interference detection result to the PDCCH selection unit 113. Alternatively, it is also possible for the interference detection unit 109 to output a signal to the effect that the occurrence of the interference is detected to the PDCCH selection unit 113, and to output nothing to the PDCCH selection unit 113 when it detects that the interference is not caused.

The Ethernet (registered trademark) signal transmission and reception unit 110 transmits and receives a signal for the Ethernet (registered trademark) to/from other base stations and higher-level apparatuses that are connected to the base station 100 via wire. For example, the Ethernet (registered trademark) signal transmission and reception unit 110 can receive the signal for the Ethernet (registered trademark) from other base stations, extract information such as the information about the PDCCH priority carrier, and output it to the adjacent cell information collection unit 111. Further, the Ethernet (registered trademark) signal transmission and reception unit 110 can receive the PDCCH priority carrier and the like of its own station from the adjacent cell information collection unit 111, convert it into the signal for the Ethernet (registered trademark), and transmit it to other base stations and the like, for example. The signal for the Ethernet (registered trademark) may contain, for example, the eNB IDs used by other base station 100s, the IDs of the CA cells, the carrier numbers, the cell IDs, and the like.

The adjacent cell information collection unit 111 collects information about the adjacent CA cells from other base stations via the Ethernet (registered trademark) signal transmission and reception unit 110. The information about the adjacent CA cells contains, for example, the eNB IDs of other base stations, the IDs of the CA cells, the carrier numbers, the cell IDs, and the like. The information about the adjacent CA cells may further contain the PDCCH priority carriers of other base stations. The adjacent cell information collection unit 111 may store the collected adjacent CA cell information into an internal memory and the like, or output the adjacent CA cell information of the base station as the handover target, out of the collected adjacent CA cell information, to the PDCCH selection unit 113, and allow the adjacent information table 112 to store the information.

Figure 11:
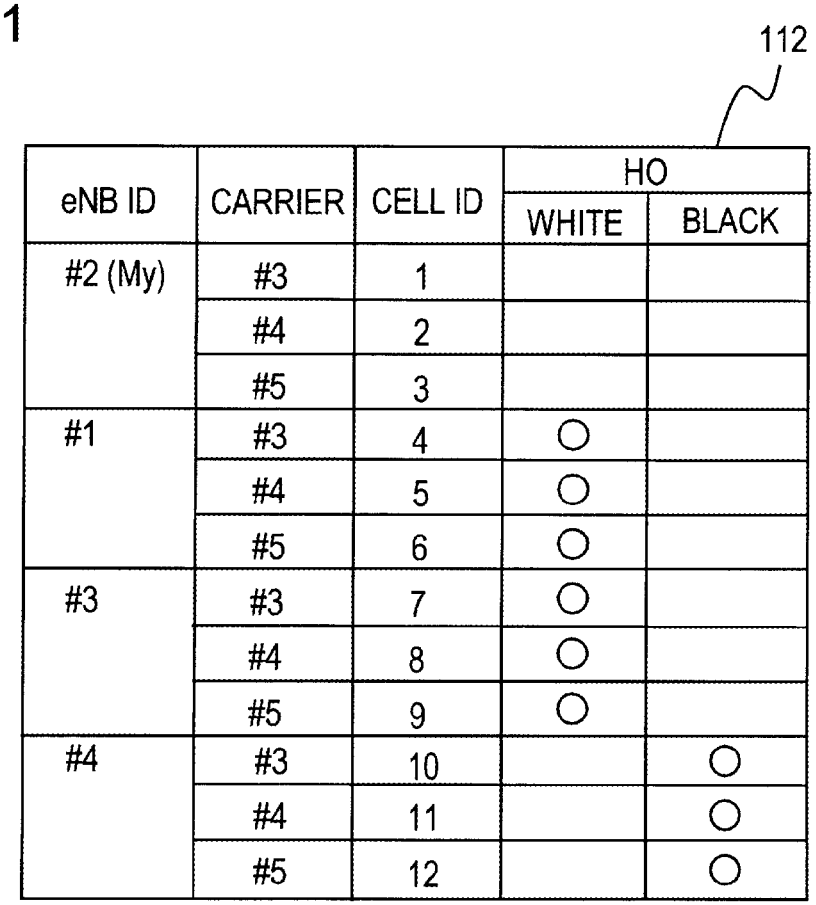
FIG. 11 is a view illustrating an example of an adjacent information table.

The adjacent information table 112 stores the information about the adjacent CA cell of the base station as the handover target. FIG. 11 illustrates an example of the adjacent information table 112. The adjacent information table 112 contains, for example, the eNB ID, the number of the carrier, the cell ID, and information set by the base station 100 about whether the base station can be the handover target or not ("White", "Black") of the base station as the handover target. For example, the base station 100 may turn on a flag of "Black" when it wishes to set the base station that is not allowed to be the handover target (or that is not allowed to be handed over), and may turn on a flag of "White" to the base station that may be handed over. When determining the handover target of the terminal 200, the base station 100 can determine whether the handover target is appropriate or not, by gaining access to this adjacent information table 112.

Back to FIG. 4, when the PDCCH selection unit 113 receives the detection result or notification that the interference is detected in the interference detection unit 109, it gains access to the priority PDCCH management table 106 and changes the PDCCH priority carrier. Namely, when the interference is detected with respect to the PDCCH priority carrier that is used up to this point, the PDCCH selection unit 113 changes the PDCCH priority carrier to another PDCCH priority carrier. The PDCCH selection unit 113 registers the changed PDCCH priority carrier in the priority PDCCH management table 106. The change processing of the PDCCH priority carrier by the PDCCH selection unit 113 will be explained later.

Incidentally, the PDCCH selection unit 113 can output the cell IDs of its own station to the radio signal transmission and reception unit 101. Thus, the base station 100 can notify the subordinate terminals 200 of the cell IDs its own station. As the cell IDs are stored in the priority PDCCH management table 106 or the adjacent information table 112, for example, the PDCCH selection unit 113 can read out the cell IDs from these tables 106 and 112 and transmit the cell IDs. It is also possible for the scheduler 104 to perform scheduling so as to periodically transmit the cell IDs of its own station to the terminals 200. When receiving the cell IDs, each of the terminal 200 identifies the carriers from the cell IDs, and can transmit the measurement report for each of the carriers.

<Configuration Example of Terminal Apparatus>

Next, a configuration example of the terminal 200 will be explained. As illustrated in FIG. 5, the terminal 200 is provided with, for example, a radio signal transmission and reception unit 201, an RSRP measuring unit 202, a measurement report transmission unit 203, an SR processing unit 204, and a PDCCH reception unit 205.

Incidentally, the reception unit 270 according to the first embodiment corresponds to the radio signal transmission and reception unit 201 and the PDCCH reception unit 205, for example.

The radio signal transmission and reception unit 201 receives the radio signal transmitted from the base station 100, converts (down-converts) the radio signal into the baseband signal, and outputs the converted baseband signal to the RSRP measuring unit 202 and the PDCCH reception unit 205. Further, the radio signal transmission and reception unit 201 converts (up-converts) the scheduling request outputted from the SR processing unit 204 and the measurement report outputted from the measurement report transmission unit 203 into the radio signal, and transmits it to the base station 100 as the radio signal. The radio signal transmission and reception unit 201 is provided with the A/D conversion circuit, the D/A conversion circuit, the frequency converter, the band pass filter (BPF) and the like, in order to perform the above-described conversion.

The RSRP measuring unit 202 extracts the reference signal from the baseband signal and, based on the reference signal, measures the RSRP (Reference Signal Received Power). The RSRP measuring unit 202 outputs the measured RSRP to the measurement report transmission unit 203. The RSRP measuring unit 202 can also measure RSRQ (Reference Signal Received Quality) other than the RSRP, for example. Here, such information that the reference signal is transmitted by using the predetermined radio resource, for example, is shared by the terminal 200 and the base station 100 and therefore, the RSRP measuring unit 202 can receive the reference signal by using this radio resource.

In addition, the RSRP measuring unit 202 can measure the RSRP of each of the carriers. The terminal 200 can receive the cell IDs from the base station 100 and, based on the received cell IDs, the RSRP measuring unit 202 can recognize for which carrier the RSRP is to be measured. Therefore, the RSRP measuring unit 202 measures the RSRPs of the carriers respectively corresponding to the plurality of cell IDs that are received. Therefore, information about the correspondence between the cell IDs and the carriers is stored in the memory or the like, for example, and the RSRP measuring unit 202, receiving the cell IDs from the base station 100, can recognize the corresponding carriers by gaining access to the memory or the like.

In addition, the RSRP measuring unit 202 can measure the RSRPs of the reference signals transmitted from other base stations 100-1, 100-3 and 100-4, other than the connected base station 100-2. In this case, it is also possible for the terminal 200 to receive the plurality of cell IDs transmitted respectively from other base stations 100-1, 100-3 and 100-4, and to receive the reference signals transmitted from other base stations 100-1, 100-3 and 1004 using the carriers corresponding to the plurality of cell IDs. Therefore, the RSRP measuring unit 202 can measure the RSRPs of the respective carriers of other base stations 100-1, 100-3 and 100-4. The RSRP measuring unit 202 outputs the measured RSRPs and the corresponding cell IDs to the measurement report transmission unit 203.

The measurement report transmission unit 203 generates the measurement report containing the measured RSRPs and the cell IDs, and transmits the generated measurement report via the radio signal transmission and reception unit 201 to the base station 100. For example, the terminal 200, being connected to the base station 100, is instructed to generate the measurement report when the RSRP of the connected base station is below a threshold value, and/or when a difference between the RSRP of the adjacent another base station and the RSRP of the connected base station is below a threshold value. Therefore, the terminal 200 transmits the measurement report when the terminal 200 is located at an edge (edge portion) of the CA cell and when the RSRP is the threshold value or less. For example, the measurement report transmission unit 203 generates the measurement report when the RSRP of the connected base station 100-2 is a first threshold value or less. At this time, the measurement report transmission unit 203 also generates the measurement report of the RSRPs of other base stations 100-1, 100-3 and 100-4, based on the instruction from the base station. Further, the measurement report transmission unit 203 allows the cell IDs of the measured RSRPs to be contained in the measurement report.

Thus, the cell IDs and the RSRPs of the respective carriers of the connected base station 100-2, and the cell IDs and the RSRPs of the respective carriers of the measured other base stations 100-1, 100-3 and 100-4 are contained in the measurement report.

The SR processing unit 204 generates the scheduling request (SR: Scheduling Request) and transmits it via the radio signal transmission unit 201 to the base station 100. For example, when the terminal 200 has data to be transmitted to the base station 100 but has no allocation opportunity of the PUSCH, the terminal 200 can transmit the scheduling request to the base station 100. Then, the base station 100 can perform scheduling to the terminal 200, and transmit scheduling information with regard to the physical uplink shared channel (PUSCH) to the terminal 200 as the control signal.

The PDCCH reception unit 205 receives the control signal transmitted from the base station 100 in response to the scheduling request. For example, the PDCCH reception unit 205 can receive the control signal by using the radio resource that is allocated for the PDCCH in advance.

<Operation Example>

Figure 12:
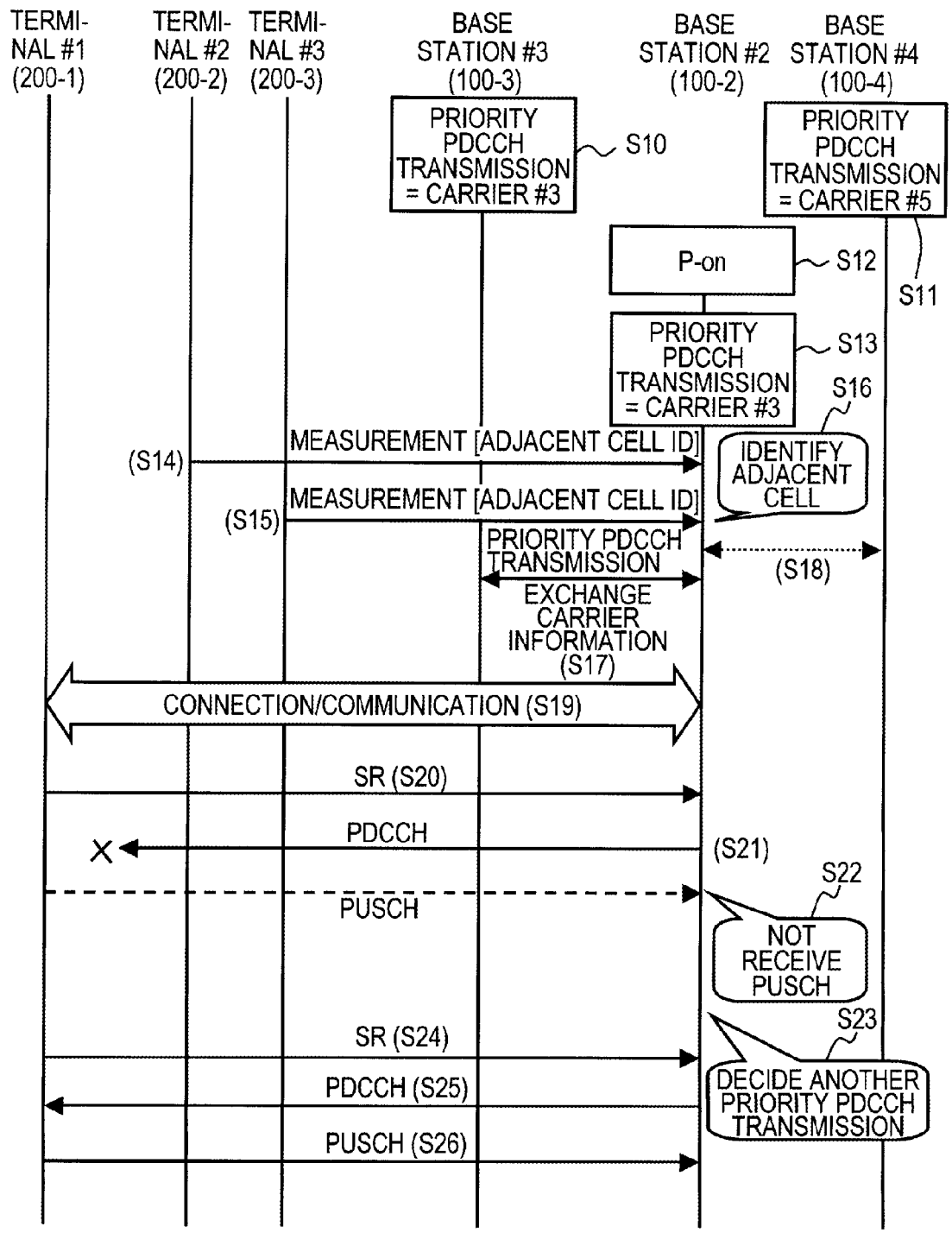
FIG. 12 is a sequence chart illustrating an operation example.
Figure 13:
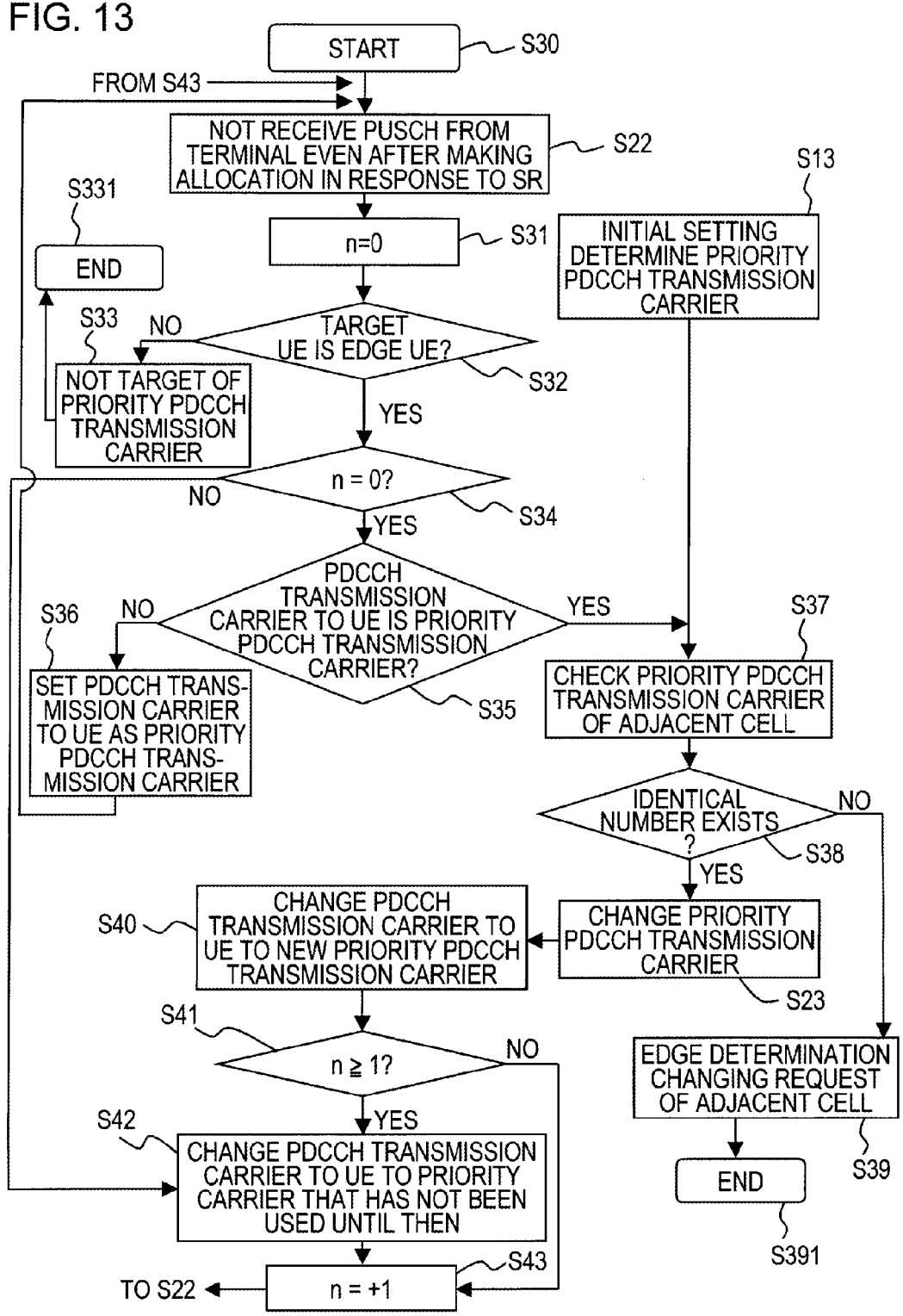
FIG. 13 is a flowchart illustrating an example of change processing of a PDCCH priority carrier.

Next, an operation example of the radio communication system 10 that is configured as above will be explained. FIG. 12 is a sequence chart illustrating the entire operation example, and FIG. 13 is a flowchart of processing of changing the PDCCH transmission carrier.

First, the operation example illustrated in FIG. 12 will be explained. In this example, it is supposed that the base station 100 includes three base stations 100-2 to 100-4, and the PDCCH priority carriers of the base stations 100-3 and 100-4 are set to have carrier numbers #3 and #5, respectively (S10, S11). It is also supposed that the base station 100-2 is not powered on, and nothing is registered in the priority PDCCH management table 106.

Then, the base station 100-2 turns the power on (S12), sets the carriers used for the downlink and the uplink by using the carrier aggregation, and initially sets the carrier number of the PDCCH priority carrier (carrier number #3, for example) (S13). The carriers to be used for the uplink and the downlink are set by the scheduler 104, for example, and the PDCCH priority carrier is set by the PDCCH selection unit 113, for example.

For example, the PDCCH selection unit 113 can determine the PDCCH priority carrier, out of a plurality of carriers set by the scheduler 104, and register the PDCCH priority carrier in the priority PDCCH management table 106. Further, the adjacent cell information collection unit 111 sets the cell IDs that are allocated by the higher-level apparatus, or the cell IDs that are not used in the cell IDs collected from other base stations, as the cell IDs to be used by its own station. The PDCCH selection unit 113 can receive the cell IDs of its own station from the adjacent cell information collection unit 111, for example, and register the cell IDs in the priority PDCCH management table 106. With regard to the eNB ID, the adjacent cell information collection unit 111 collects the eNB ID allocated from the higher-level apparatus, or generates the eNB ID of its own station including the cell IDs. Thus-collected or generated eNB ID is registered in the priority PDCCH management table 106 by the PDCCH selection unit 113. Thus, the information is registered in the items from, for example, the "eNB ID" to the "PDCCH transmission carrier" with regard to the base station 100-2 as its own station, as illustrated in FIG. 6.

Incidentally, the base station 100-2 can transmit the reference signal after turning the power on. For example, the RS signal generation unit 102 controls the radio signal transmission and reception unit 101 so as to transmit the reference signal by using the downlink communication carriers (for example, carrier #3 to carrier #5) that are set by the scheduler 104. Further, the base station 100-2 can also transmit the cell IDs of its own station. For example, the PDCCH selection unit 113 can transmit the cell IDs of its own station via the radio signal transmission and reception unit 101.

Next, the terminal 200-2 generates the measurement report based on the reference signal transmitted from the base station 100-2, and transmits it to the base station 100-2 (S14). When, for example, the terminal 200-2 is located near the edge of the CA cell of the base station 100-2, and the RSRP of one of the carriers in the CA cell becomes the first threshold value or less, the measurement report can be transmitted. Alternatively, the measurement report can be transmitted by the terminal 200-2 when a signal requesting the terminal 200-2 to transmit the measurement report is transmitted by the base station 100-2. The measurement report contains, for example, the RSRPs of the respective carriers in the base station 100-2, and the RSRPs of the respective carriers in other base stations 100-3 and 100-4. In this case, it is supposed that the RSRP measuring unit 202 of the terminal 200 can receive the reference signals respectively transmitted from other base stations 100-3 and 100-4 and can measure the RSRPs. The measurement report also contains the cell IDs corresponding to the respective carriers whose RSRPs are measured.

Next, the terminal 200-3 also transmits the measurement report to the base station 100-2, based on the reference signal transmitted from the base station 100-2 (S15). This measurement report also contains the RSRPs of the respective carriers of the base stations 100-2 to 100-4, and the respective cell IDs.

Next, the base station 100-2 identifies other base stations, based on the received measurement report, and makes the registration in the priority PDCCH management table 106 (S16). For example, the measurement report reception unit 105 identifies other base stations 100-3 and 100-4 from the cell IDs contained in the received measurement report, and determines whether these are the base stations as the interference source or not, according to the RSRPs.

With regard to the determination whether the base station is the interference source or not, another base station 100-3 is determined as the base station as the interference source when a difference value between the RSRP of its own station and the RSRP of another base station 100-3 that are contained in the received measurement report is a second threshold value or less, for example. In this case, a plurality of RSRPs exist corresponding to the plurality of carriers in its own station and in another base station 100-3, and the measurement report reception unit 105 compares each of the difference values, between the RSRPs of the identical carriers, with the second threshold value. At this time, the base station may be determined by the measurement report reception unit 105 as the base station as the interference source when at least one of the difference values of the identical carriers is the second threshold value or less, or the base station can be determined as the base station as the interference source when all the difference values are the second threshold value or less. The other base station 100-4 is determined in a similar manner. Incidentally, when the difference is greater than the second threshold value, the measurement report reception unit 105 may determine that other base stations 100-3 and 100-4 are not the base stations as the interference source, such that the registration to the priority PDCCH management table 106 is not made.

Other base stations 100-3 and 100-4 that are determined as the base stations as the interference source are added to the priority PDCCH management table 106 as new entries. In this case, the measurement report reception unit 105 acquires, for example, the eNB IDs, the carrier numbers, and the CA cell IDs corresponding to the cell IDs of other base stations 100-3 and 100-4 that are determined as the base stations as the interference source, from the adjacent information table 112 or the adjacent cell information collection unit 111. Then, the measurement report reception unit 105 newly registers the eNB IDs, the carrier numbers, the cell IDs, and the CA cells in the priority PDCCH management table 106. Thus, as illustrated in FIG. 6, for example, the entries such as "#3" and "#4" are added to the priority PDCCH management table 106, as the eNB IDs of the interference sources. Incidentally, the registration of the CA cell IDs is not made in the example illustrated in FIG. 6, because each of the base stations has one CA cell.

When the base station as the interference source is determined by the measurement report reception unit 105, the registration in the "Last interference calculation result" in the priority PDCCH management table 106 is also made. For example, the measurement report reception unit 105 uses the RSRP of its own station and the RSRP of another base station 100-3 that are contained in the measurement report received within a certain period of time (T second) to calculate:

(RSRP of its own station)−(RSRP of another base station)

for each of the carriers, and registers the calculated value in the "Last interference calculation result". When there are the plurality of measurement reports received, the RSRPs of its own station and the RSRPs of another base station from all the terminals may be averaged, or the n RSRPs may be sampled to find an average value. Then, the value is registered in the corresponding item of the "Last interference calculation result" in the priority PDCCH management table 106 of FIG. 6, for example. Thus, the latest calculation result is registered in the "Last interference calculation result".

Next, the base station 100-2 exchanges the carrier numbers of the PDCCH priority carriers of the base stations as the interference source 100-3 and 100-4 (S17, S18). For example, when the PDCCH selection unit 113 detects the addition of the entry of the "eNB ID" and the like into the priority PDCCH management table 106, it instructs the adjacent cell information collection unit 111 to exchange the PDCCH priority carriers with the base station having the eNB ID. Receiving the instruction, the adjacent cell information collection unit 111 requests acquisition of the PDCCH priority carrier from the base station having the eNB ID via the Ethernet (registered trademark) signal transmission and reception unit 110, and acquires the PDCCH priority carrier of the base station having the eNB ID. In addition, the adjacent cell information collection unit 111 receives the PDCCH priority carrier of its own station from the PDCCH selection unit 113, and transmits the PDCCH priority carrier of its own station to the base station having the eNB ID. Thus, the adjacent cell information collection unit 111 can acquire the PDCCH priority carriers of other base stations 100-3 and 100-4, and register these in the corresponding item in the priority PDCCH management table 106 via the PDCCH selection unit 113. Incidentally, the PDCCH priority carriers can be collected from or transmitted to other base stations 100-3 and 100-4 periodically.

Thus, the base station 100-2 can store the information in the items from the "eNB ID" to the "Last interference calculation result" in the priority PDCCH management table 106, with regard to its own station and other base stations 100-3 and 100-4.

Next, the base station 100-2 performs connection processing of the radio communication with the terminal 200-1 (S19). The base station 100-2 and the terminal 200-1 perform the connection processing by, for example, exchanging ranging messages and the like.

Next, the terminal 200-1 transmits the scheduling request (SR) to the base station 100-2 (S20). The scheduling request is generated in the SR processing unit 204, and transmitted to the base station 100-2 via the radio signal transmission and reception unit 201, for example.

Next, the base station 100-2 receives the scheduling request transmitted from the terminal 200-1, and transmits the control signal based on the scheduling request (S21). For example, when receiving the scheduling request via the radio signal transmission and reception unit 101, the message transmission and reception unit 103 outputs the scheduling request to the scheduler 104. Based on the scheduling request, the scheduler 104 performs scheduling of the PUSCH to the terminal 200-1, generates information about the radio resource of the PUSCH to the terminal 200-1, and outputs it to the PDCCH transmission unit 107 as the scheduling information. The scheduler 104 instructs the PDCCH transmission unit 107 to generate the control signal and, based on the instruction, the PDCCH transmission unit 107 generates the control signal containing the scheduling information, and transmits it to the terminal 200-1 via the radio signal transmission and reception unit 101. In addition, the scheduler 104 acquires the PDCCH priority carrier from the priority PDCCH management table 106, for example, and instructs the PDCCH transmission unit 107 to transmit the control signal by using this PDCCH priority carrier. Based on this instruction, the PDCCH transmission unit 107 instructs the radio signal transmission and reception unit 101 to transmit the generated control signal by using the PDCCH priority carrier, for example. Based on this instruction, the radio signal transmission and reception unit 101 converts the control signal into the radio signal so that it is transmitted over the PDCCH priority carrier. Thus, the control signal containing the radio resource information of the PUSCH is transmitted to the terminal 200-1 by using the PDCCH priority carrier.

Next, the base station 100-2 detects the interference (S22). The detection of the interference is made by the interference detection unit 109, and a detection method is as follows, for example. Specifically, the interference detection unit 109 detects that the interference is caused when, even after the allocation of the PUSCH, it is unable to receive the radio signal from the terminal 200-1 for a consecutive and certain number of times, and detects that the interference is not caused when it is able to receive the radio signal from the terminal 200-1. According to the example of FIG. 12, the occurrence of the interference is detected as the radio signal is not able to be received consecutively. For example, the base station 100-2 is unable to receive the radio signal even after receiving the scheduling request from the terminal 200 (S20), which raises the possibility that the terminal 200-1 in unable to receive the control signal due to the interference (S21). Therefore, the interference detection unit 109 determines that the interference is caused when such a situation occurs, and determines that the interference is not caused when it can receive the radio signal.

Incidentally, the certain number of times may be equal to the number of re-transmission of HARQ, or the number of re-transmission of HARQ or more or less, for example. The interference detection unit 109 may have a counter in its inside, for example, for the purpose of performing such detection.

The interference detection unit 109 can receive the scheduling information from the scheduler 104, for example, in order to detect the interference. By using the information about the radio resource of the uplink allocated by the scheduler 104, the interference detection unit 109 can detect whether the radio signal is received or not, and thus the interference detection unit 109 detects the interference by monitoring the radio signal received in the radio signal transmission and reception unit 101. Upon detection of the occurrence of the interference, the interference detection unit 109 can output the detection result, containing the UE ID of the terminal 200-1 to be interfered, to the PDCCH selection unit 109. Based on the UE ID contained in the radio resource allocation information received from the scheduler 104, for example, the interference detection unit 109 can output the interference result containing the UE ID of the terminal 200-1, with which the interference is caused. Incidentally, when the interference detection unit 109 detects that the interference is not caused, the following processing is not performed by the base station 100-2.

When the base station 100-2 detects the interference, it changes the PDCCH priority carrier of its own station that is registered in the priority PDCCH management table 106 (S23). Details of the change processing of the PDCCH priority carrier will be explained below.

FIG. 13 is the flowchart illustrating an operation example of the change processing of the PDCCH priority carrier. This processing partially overlaps with the processing of FIG. 12, and the numerals and symbols that are identical to those of the processing of FIG. 12 are used to designate the overlapped processing. Incidentally, it is supposed that the above-described PDCCH priority carrier is determined as the initial setting (S13).

The base station 100-2 starts the processing (S30), detects the occurrence of the interference (S22), and performs the subsequent processing.

Next, the base station 100-2 sets a value of n as "0" (S31). The change frequency of the transmission carrier for transmitting the control signal over the PDCCH (hereinafter referred to as a "PDCCH transmission carrier") is defined as n, for example. In this processing, the PDCCH transmission carrier is changed by changing the PDCCH priority carrier of its own station at the time of the initial change and, when the interference is detected even after that, the PDCCH transmission carrier is changed for each terminal 200-1 at the second and subsequent changes. Thus, the change frequency n is used because the processing in the base station 100-2 is changed according to the change frequency. For example, the PDCCH selection unit 113 makes the setting by receiving from the interference detection unit 109 the detection result that the interference is present and the UE ID of the terminal 200-1 to be interfered, and storing "0" in a field of the "change frequency" of the corresponding terminal 200-1 in the terminal management table 108.

Next, the base station 100-2 detects whether the terminal 200-1, from which the radio signal is not able to be received, is located at the edge (edge portion) of the CA cell or not (S32). When, for example, the target terminal 200-1 is located inside the CA cell (near the base station 100-2, for example), not at the edge of the CA cell (or within a threshold distance from a boundary of a radio wave reachable range), and the radio signal is not able to be received even after the allocation of the radio resource is made, it may be due to a factor other than the interference. Therefore, when the terminal 200-1 is located at the position other than the edge of the CA cell (No in S32), the terminal 200-1 is not supposed to be a target of this processing (S33), according to this embodiment. Incidentally, it is possible to detect whether the target terminal 200-1 is located at the edge of the CA cell or not by, for example, determining whether the RSRP of its own station, contained in the latest measurement report with respect to the terminal 200-1, is a third threshold value or less or not. For example, the measurement report reception unit 105 determines that the terminal 200-1 is located at the edge of the CA cell when the RSRP of its own station is the third threshold value or less and, when this is not the case, determines that the terminal 200-1 is not located at the edge of the CA cell. The measurement report reception unit 105 can notify the PDCCH selection unit 113 of the determination result, via the priority PDCCH management table 106, for example. The PDCCH selection unit 113 performs the subsequent processing when the determination result indicates that the terminal is located at the edge, and, when the determination result indicates that the terminal is not located at the edge, the PDCCH selection unit 113 finishes the processing (S33) by regarding the terminal as not being the target (S33).

When the base station 100-2 detects that the target terminal 200-1 is located at the edge of the CA cell (Yes in S32), it determines whether the change frequency n of the PDCCH transmission carrier is "0" or not (S34). When the change frequency n is "0", for example, it means that the PDCCH priority carrier does not changed yet, and when the change frequency is "1" or more, it means that the PDCCH priority carrier is already changed. The change processing changes according to the change frequency n, as described above, and the change processing is branched from this processing. For example, the PDCCH selection unit 113 can read out the change frequency n of the target terminal 200-1, registered in the terminal management table 108, for determination.

When the change frequency n is "0" (Yes in S34), the base station 100-2 detects whether the PDCCH transmission carrier to the terminal 200-1 is the PDCCH priority carrier or not (S35). When the PDCCH transmission carrier of the terminal 200-1 is individually allocated before performing this processing, for example, the transmission carrier is kept being allocated individually. Therefore, when the PDCCH transmission carrier to the terminal 200-1 is not the PDCCH priority carrier (No in S35), the base station 100-2 changes the PDCCH transmission carrier that is individually allocated to the terminal 200-1 to the PDCCH priority carrier of its own station (S36). Then, the processing moves to S22 and is repeated again by the base station 100-2. For example, the PDCCH selection unit 113 reads out the PDCCH transmission carrier from the terminal management table 108, and reads out the priority PDCCH transmission carrier from the priority PDCCH management table 106, so as to perform the detection by determining whether the both carriers agree with each other or not. When the both carriers do not agree with each other, for example, the PDCCH selection unit 113 changes the PDCCH transmission carrier of the terminal 200-1, stored in the terminal management table 108, to the PDCCH priority carrier.

Meanwhile, when the PDCCH transmission carrier to the terminal 200-1 is the PDCCH priority carrier (Yes in S35), the base station 100-2 checks the PDCCH priority carriers in other base stations 100-3 and 100-4 (S37). For example, the PDCCH selection unit 113 reads out the PDCCH priority carriers of other base stations 100-3 and 100-4 from the item of the "PDCCH priority carrier" registered in the priority PDCCH management table 106.

Next, the base station 100-2 determines whether the carrier number identical to that of the PDCCH priority carrier of its own station is used as the PDCCH priority carrier in other base stations 100-3 and 100-4 or not (S38). This is because, even when the base station 100-2 detects the interference (S22), it is foreseeable that the interference is not due to the control signal transmitted from other base stations 100-2 and 100-3, when other base stations 100-2 and 100-3 do not use the PDCCH priority carrier identical to that of the base station 100-2.

When the same PDCCH priority carrier does not exist (No in S38), the base station 100-2 transmits an edge determination changing request to the terminal 200-1 (S39). For example, the base station 100-2 transmits the changing request of the first threshold value, as the threshold value to decide whether to transmit the measurement report or not, to the terminals 200-1 to 200-3. In this case, the base station 100-2 transmits the changing request to change the first threshold value to have the smaller value, for example, so that the transmission of the measurement report by the terminals 200-1 to 200-3, and the registration of the base station as the interference source in the priority PDCCH management table 106 are caused less frequently than in the past. Incidentally, the PDCCH selection unit 113 may read out the PDCCH priority carriers from the priority PDCCH management table 106, and determine whether the PDCCH priority carrier of its own station is the same as the PDCCH priority carriers of other base stations or not. Incidentally, the base station 100-2 transmits the edge determination changing request (S39), and thereafter, finishes the processing (S391). The edge determination changing request and the change of the first threshold value are made by, for example, the PDCCH selection unit 113, the scheduler 104 or the like, and the first threshold value after the change is transmitted to the terminal 200-1.

Meanwhile, when the carrier that is the same as the PDCCH priority carrier of its own station is used as the PDCCH priority carrier in any of other base stations 100-3 and 100-4 (Yes in S38), the base station 100-2 changes the PDCCH priority carrier of its own station (S23). It is because the interference is considered to be caused when the identical PDCCH priority carrier is used in other base stations 100-3 and 100-4.

The change can be made as follows, for example. Specifically, the PDCCH selection unit 113 changes the carrier to the carrier that is not used (that is free) as the PDCCH priority carrier in other base stations 100-3 and 100-4 according to the priority PDCCH management table 106. When there are a plurality of carriers that are not used, the PDCCH selection unit 113 can select either one carrier on a random basis, or select the carrier with the least interference, among the plurality of carriers. The carrier with the least interference means, for example, the carrier whose value stored in the "Last interference calculation result" is the greatest in the priority PDCCH management table 106. In the example of FIG. 6, the PDCCH selection unit 113 selects the carrier #5, as the carrier #5 is not used as the PDCCH priority carrier in other base stations 100-3 and 100-4. This is because, when the control signal is transmitted over the PDCCH priority carrier that is not used by other base stations 100-3 and 100-4, the interference with the control signal transmitted from other base stations can be avoided, and the possibility of receiving the control signal in the terminal 200-1 is improved more than in the past.

Further, when all the carriers are used as the PDCCH priority carriers in other base stations 100-2 and 100-3 (when there is no free carrier number), the PDCCH selection unit 113 changes the carrier with the least interference to the PDCCH priority carrier. In the example of FIG. 6, when the base station (#4) 100-4 uses the carrier #5 as the PDCCH priority carrier, the PDCCH selection unit 113 changes the carrier that is other than the carrier #4 and that has the greatest value stored in the "Last interference calculation result", to the PDCCH priority carrier. This is because, even though the carrier used in the base stations 100-3 and 100-4 for transmitting the control signal is used by the base station 100-2, the possibility of avoiding the interference with the control signal of other base stations 100-3 and 100-4 can be improved when the carrier with the least interference is used, as compared with the case of doing nothing.

After changing the PDCCH priority carrier, the base station 100-2 registers the carrier after the change in the priority PDCCH management table 106. For example, in the above-described example, the PDCCH selection unit 113 changes the PDCCH priority carrier in the priority PDCCH management table 106 from the carrier #4 to the carrier #5.

Next, the base station 100-2 changes the PDCCH priority carrier after the change to the PDCCH transmission carrier to the terminal 200-1 (S40). For example, the PDCCH selection unit 113 changes the PDCCH transmission carrier of the terminal 200-1, registered in the terminal management table 108, to the PDCCH priority carrier after the change. Then, the scheduler 104, for example, gains access to the terminal management table 108 or the priority PDCCH management table 106, and reads out the carrier number of the PDCCH priority carrier. At the time of the scheduling of the radio resource to the subordinate terminal, such as the terminal 200-1, the scheduling can be made by the scheduler 104 so as to transmit the control signal by using the PDCCH priority carrier after the change, after this.

Next, the base station 100-2 detects whether the change frequency n is "1" or more or not (S41). As described above, the PDCCH priority carrier is changed as the initial change of the PDCCH transmission carrier when n=0, and the PDCCH transmission carrier is individually changed in other cases, and therefore, the change frequency n is checked again.

When the change frequency n is not "1" or more (No in S41), the base station 100-2 adds "1" to the change frequency n (S43). For example, the PDCCH selection unit 113 changes the change frequency of the corresponding terminal 200-1 in the terminal management table 108 from "0" to "1". Alternatively, the PDCCH selection unit 113 adds "1" to the change frequency n that is stored in the internal memory or the like, and re-stores the change frequency n. Then, the processing moves to S22 again and the above-described processing is repeated.

Meanwhile, when the change frequency n is "1" or more, the PDCCH priority carrier is changed already, and in this case, the base station 100-2 changes the PDCCH transmission carrier to the terminal 200-1 to the carrier that is unused until then (S42). The carrier is changed to the unused carrier if there is the carrier that is not used (that is free) as the PDCCH priority carriers in other base stations 100-3 and 100-4, even after the change of the PDCCH priority carrier (S23), for example. When there are a plurality of unused PDCCH priority carriers, the carrier may be selected on a random basis, or the carrier with the least interference (with the greatest "Last interference detection result") may be selected. Further, when all the carriers are used as the PDCCH priority carriers by other base stations 100-3 and 100-4, the carrier with the least interference (with the greatest "Last interference detection result") is changed to the PDCCH transmission carrier, out of the carriers except for the PDCCH priority carrier of its own station. The PDCCH transmission carrier is changed by, for example, the PDCCH selection unit 113, similarly to S23. In the change processing for the second and third times after the PDCCH priority carrier is changed in the initial change, the base station 100-2 selects the carrier that is not used as the PDCCH priority carriers in other base stations 100-3 and 100-4, or the carrier with the least interference to less interference. Incidentally, even when the change frequency n is not "0" (No in S34), the processing shifts to S42 and the base station 100-2 changes the PDCCH priority carrier to the terminal 200-1.

Then, the base station 100-2 adds "1" to the change frequency n (S43), and the processing moves to S22.

The example of the carrier change processing in the base station 100-2 is explained thus far, but when the terminal 200-1 releases the connection with the base station 100-2, for example, the carrier change processing finishes even in the middle of the processing. The processing finishes when the terminal 200-1 hands over to other base stations 100-3 and 100-4, or when the terminal 200-1 itself turns the power off, for example.

Back to FIG. 12, the terminal 200-1 transmits the scheduling request (SR) again (S24). The scheduling request is transmitted again because the terminal 200-1 does not received the control signal in response to the scheduling request that is requested in the past (S20), and is unable to transmit the data and the like to the base station 100-2 under this situation.

Upon receipt of the scheduling request, the base station 100-2 allocates the radio resource to the terminal 200-1 again, and transmits it to the terminal 200-1 as the control signal (S25). At this time, the base station 100-2 transmits the control signal by using the PDCCH priority carrier after the change.

Next, the terminal 200-1 receives the transmitted control signal, converts the data and the like into the radio signal, and transmits it to the base station 100-1, according to the information about the radio resource contained in the control signal (S26).

FIG. 12 illustrates the example in which the interference can be avoided by the initial change of the PDCCH transmission carrier (the change of the PDCCH priority carrier), and the terminal 200-1 can receive the control signal normally. When the terminal 200-1 is unable to receive the control signal due to the interference, even after the initial change of the PDCCH priority carrier, the base station 100-2 changes the PDCCH transmission carrier to the terminal 200-1, without changing the PDCCH priority carrier (S42 in FIG. 13), as described above.

As explained thus far, upon transmitting/receiving the radio signal by using the plurality of carriers by using the carrier aggregation, the base station 100 according to this embodiment changes the carrier for transmitting the control signal, when the interference is detected with regard to the transmission of the control signal to the terminal 200. As the base station changes the carrier for transmitting the control signal, the interference with the control signal transmitted from other base stations can be avoided, and the control signal transmitted from the base station 100 can be received in the terminal 200. As the terminal 200 can receive the control signal, it can transmit the data and the like to the base station 100, and establish the radio communication with the base station 100, for example.

Incidentally, according to the second embodiment, the explanation is given to the example in which each of the base stations 100-1 to 100-4 mainly has one CA cell. Even when there are the plurality of CA cells, the PDCCH transmission carrier can be changed similarly to the above-described example, because the same PDCCH priority carrier is used in all the CA cells in the same base station 100, for example. In the example of FIG. 8, when the PDCCH priority carrier of the base station (#1) 100-1 is the carrier #4, for example, the PDCCH priority carrier after the change in the base station (#2) 100-2 may be the carrier #3 or the carrier #5 that is not used (that is free).

Third Embodiment

Next, a third embodiment will be explained. According to the second embodiment, the priority PDCCH management table 106 and the adjacent information table 112 are explained as the separate tables, but these may be identical. In this case, for example, the priority PDCCH management table 106 is also used as and has the function of the adjacent information table 112, which will be referred to when, for example, the terminal 200 performs the handover.

Figure 14:
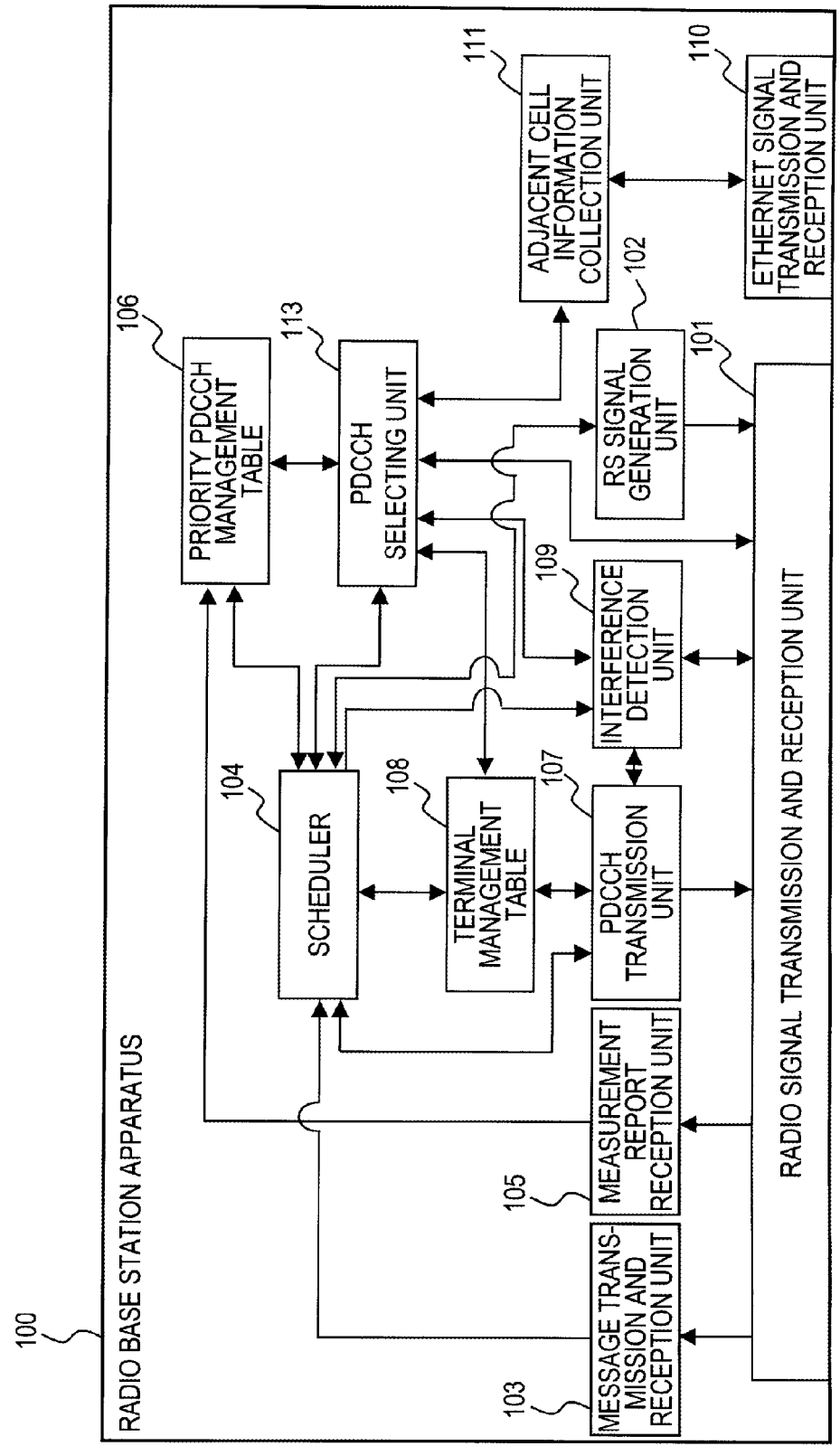
FIG. 14 is a view illustrating a configuration example of the radio base station apparatus.
Figure 15:
FIG. 15 is a view illustrating an example of the priority PDCCH management table.

FIG. 14 is a view illustrating a configuration example of the base station 100, and FIG. 15 is a view illustrating a configuration example of the priority PDCCH management table (hereinafter referred to as a "multi-use priority PDCCH management table") 106, when the priority PDCCH management table 106 is also used as the adjacent information table 112. As illustrated in FIG. 14, the base station 100 according to this example is the same as the configuration example of the base station 100 according to the second embodiment (FIG. 4, for example), except that the adjacent information table 112 is excluded.

As illustrated in FIG. 15, the multi-use priority PDCCH management table 106 has additional items of "White" and "Black", indicating whether the handover is allowed or not as the handover target. The "White" means that the base station 100 (or the CA cell) is allowed to be handed over, and the "Black" means that the base station 100 (or the CA cell) is not allowed to be handed over. In the example of FIG. 15, the base station (#4) is set as the base station that is not allowed to be handed over. Incidentally, the base station (#5) is the base station detected as the interference source, although it is not originally registered in the multi-use priority PDCCH management table 106 as the base station to be handed over. Not only information about the base station as the handover target, but also information about the base station as the interference source, is registered in the multi-use priority PDCCH management table 106. The base station as the interference source, not only the base station as the handover target, is registered, similarly to the priority PDCCH management table as explained in the second embodiment (FIG. 6, FIG. 8, for example).

Incidentally, operation similar to that of the second embodiment (FIG. 12, FIG. 13, for example) can also be performed in the example of the multi-use priority PDCCH management table 106. This is because the items stored in the multi-use priority PDCCH management table 106 do not change, except that the items of the "White" and "Black" are added thereto.

Figure 16:
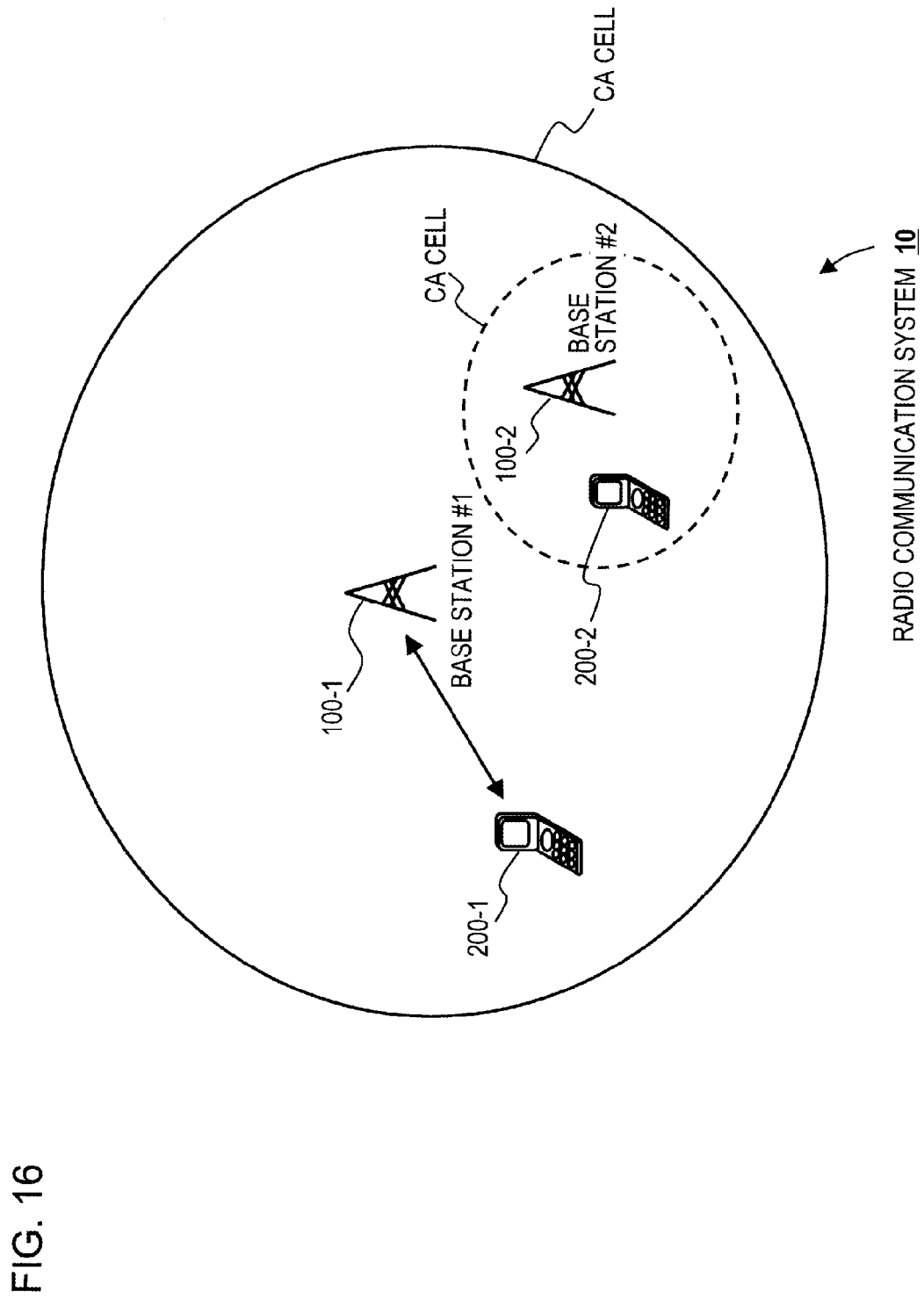
FIG. 16 is a view illustrating a configuration example of the radio communication system.

In addition, implementation as another embodiment is also possible in the radio communication system 10 having, for example, a macrocell and a femcell, other than the radio communication system 10 explained in the second embodiment. FIG. 16 is a view illustrating a configuration example of such a radio communication system 10, in which the macrocell is formed by the base station 100-1 and the femtocell is formed by the base station 100-2. When the carrier aggregation is performed in such a radio communication system 10, the carriers used by the base station 100-1 can be the carrier #1 to the carrier #2, and the carriers used by the base station 100-2 can be the carrier #3 to the carrier #5. It is possible to avoid the interference of the radio signal transmitted/received respectively, by using the different carriers in the macrocell and the femtocell. This also applies to the transmission of the control signal, and the base station 100-1 forming the macrocell sets the PDCCH priority carrier from the carrier #1 and carrier #2, for example. Further, the base station 100-2 forming the femtocell sets the PDCCH priority carrier from the carrier #3 to carrier #5. Thus, the interference of the control signal can be avoided.

Although the interference is caused when the same carrier is set as the PDCCH priority carriers in the base stations 100-1 and 100-2 at the time of the initial setting, the interference can be avoided in this case by changing the PDCCH priority carrier to the carrier that is not used or the carrier with the least interference, similarly to the second embodiment. Namely, implementation can be made, similarly to the second embodiment, in the radio communication system 10 having the femtocell and the macrocell.

Figure 17A:
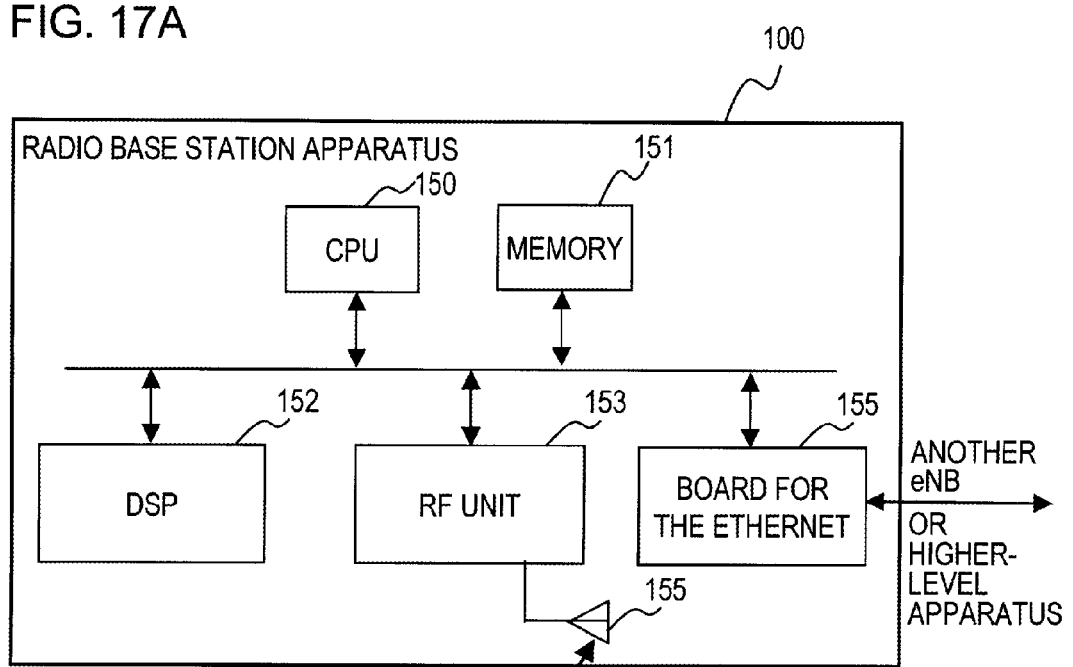
FIG. 17A and FIG. 17B are views illustrating configuration examples of the radio base station apparatus and the terminal apparatus, respectively.
Figure 17B:
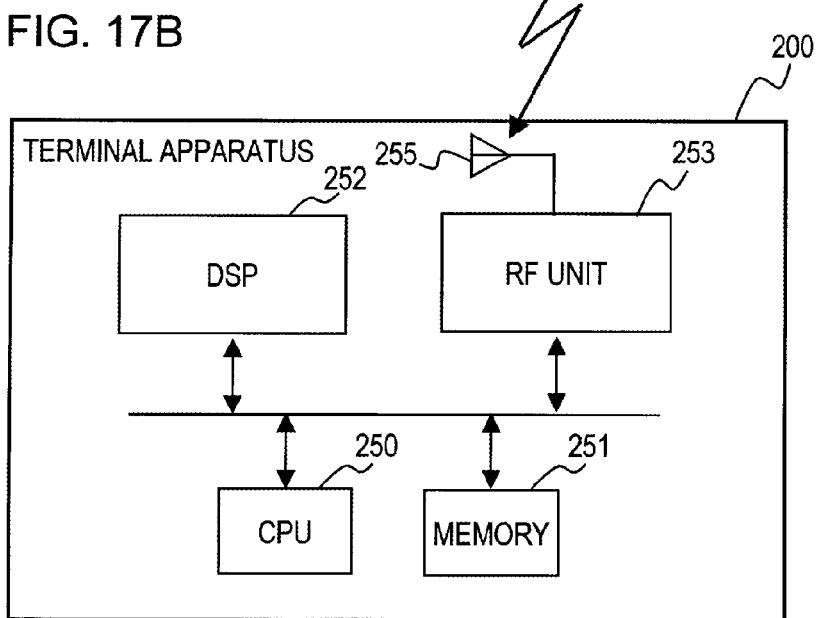

Further, the operation explained in the above-described second embodiment can also be implemented by configuration examples of the base station 100 and the terminal 200 according to the third embodiment, as illustrated in FIG. 17A and FIG. 17B.

The base station 100 is provided with a CPU (Central Processing Unit) 150, a memory 151, a DSP (Digital Signal Processor) 152, an RF (Radio Frequency) unit 153, an Ethernet (registered trademark) board 154, and an antenna 155. The DSP 152 operates based on an instruction from the CPU 150 and, when the DSP 152 is operated, it can realize various functions of the RS signal generation unit 102, the message transmission and reception unit 103, the scheduler 104, the measurement report reception unit 105, the PDCCH transmission unit 107, the interference detection unit 109, the adjacent cell information collection unit 111, and the PDCCH selection unit 113 according to the second embodiment (FIG. 4, for example), for example. Therefore, the CPU 150 and the DSP 152 correspond to, for example, the RS signal generation unit 102, the message transmission and reception unit 103, the scheduler 104, the measurement report reception unit 105, the PDCCH transmission unit 107, the interference detection unit 109, the adjacent cell information collection unit 111, and the PDCCH selection unit 113. Further, the memory 151 corresponds to, for example, the priority PDCCH management table 106, the terminal management table 108, and the adjacent information table 112 according to the second embodiment (FIG. 4, for example). Furthermore, the Ethernet (registered trademark) board 154 corresponds to, for example, the Ethernet (registered trademark) signal transmission and reception unit 110 according to the second embodiment (FIG. 4, for example), and the RF unit 153 and the antenna 155 correspond to the radio signal transmission and reception unit 101 according to the second embodiment (FIG. 4, for example).

The terminal 200 is provided with a CPU 250, a memory 251, a DSP 252, an RF unit 253, and an antenna 255. The DSP 252 operates based on an instruction from the CPU 250 and, when the DSP 252 is operated, it can realize various functions of the RSRP measuring unit 202, the measurement report transmission unit 203, the SR processing unit 204, and the PDCCH reception unit 205 according to the second embodiment (FIG. 5, for example), for example. Therefore, the CPU 250 and the DSP 252 correspond to, for example, the RSRP measuring unit 202, the measurement report transmission unit 203, the SR processing unit 204, and the PDCCH reception unit 205 according to the second embodiment (FIG. 5, for example). Further, the RF unit 253 and the antenna 255 correspond to, for example, the radio signal transmission and reception unit 201 according to the second embodiment (FIG. 4, for example).

The operation explained in the second embodiment can be performed by the base station 100 and the terminal 200 that are illustrated in FIG. 17A and FIG. 17B, for example.

Fourth Embodiment

Next, a fourth embodiment will be explained. According to the fourth embodiment, an explanation will be given to the details of interference determination processing in the base station 100. According to the example of the interference determination of the second embodiment, such an explanation was given that the occurrence of the interference is detected when the radio signal is not able to be received from the terminal 200-1, even after the allocation of the PUSCH is made by the base station 100-2. Alternatively, such an explanation was given that the occurrence of the interference is detected when the base station 100-2 is not able to receive the radio signal from the terminal 200-1 for the consecutive and certain number of times. Its details will be explained in the fourth embodiment.

Figure 18:
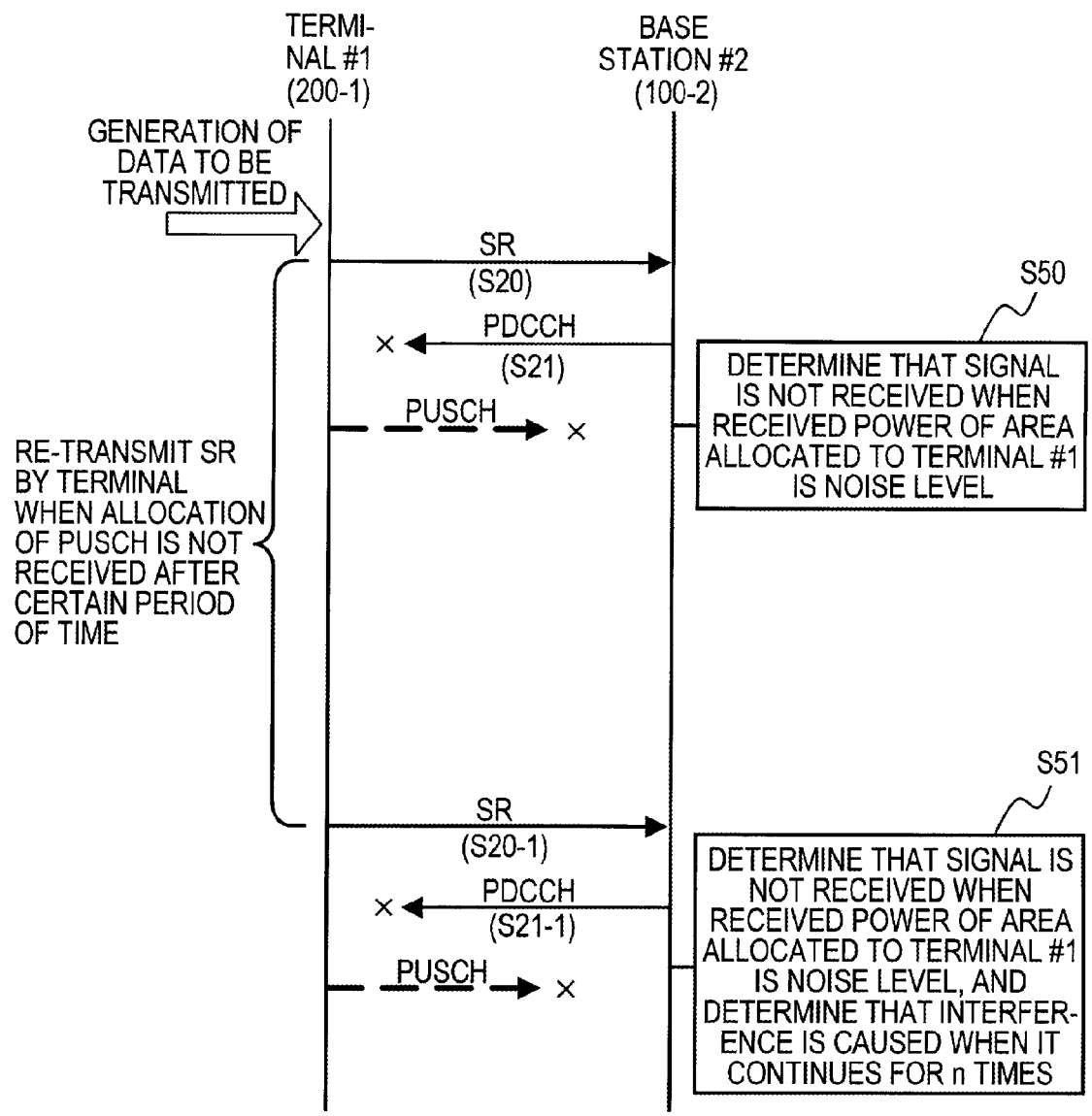
FIG. 18 is a sequence chart illustrating an operation example of interference determination processing.
Figure 19:
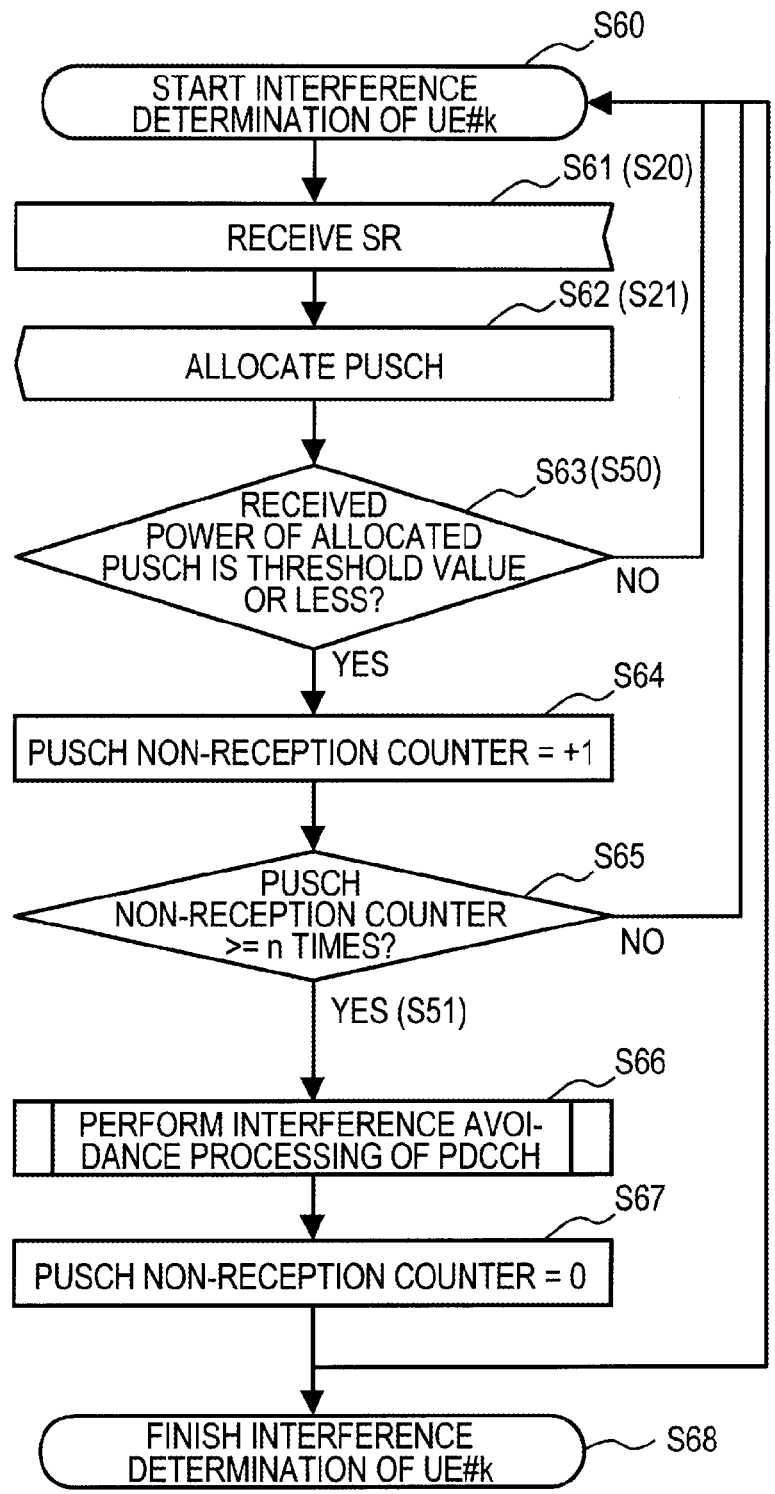
FIG. 19 is a flowchart illustrating the operation example of the interference determination processing.

FIG. 18 is a sequence chart illustrating an operation example of the interference determination processing. Further, FIG. 19 is a flowchart illustrating the operation example of the interference determination processing in the base station 100-2. Incidentally, FIG. 18 corresponds to the processing from S21 to S23 in the operation example of the second embodiment, for example (FIG. 12, for example). Furthermore, FIG. 19 illustrates the operation example after the scheduling request is received from the terminal 200-1 (S20). An explanation will be given to FIG. 18 and, as appropriate, to FIG. 19.

First, the terminal 200-1 transmits the scheduling request to the base station 100-1 (S20 in FIG. 18). Similarly to the second embodiment, the terminal 200-1 transmits the scheduling request when the terminal 200-1 has data to be transmitted but has no allocation opportunity of the PUSCH, for example.

Upon receipt of the scheduling request, the base station 100-2 allocates a predetermined radio resource (time and frequency, for example) in the physical uplink shared channel (PUSCH), so that the terminal 200-1 can transmit the data.

Figures 20, 21:
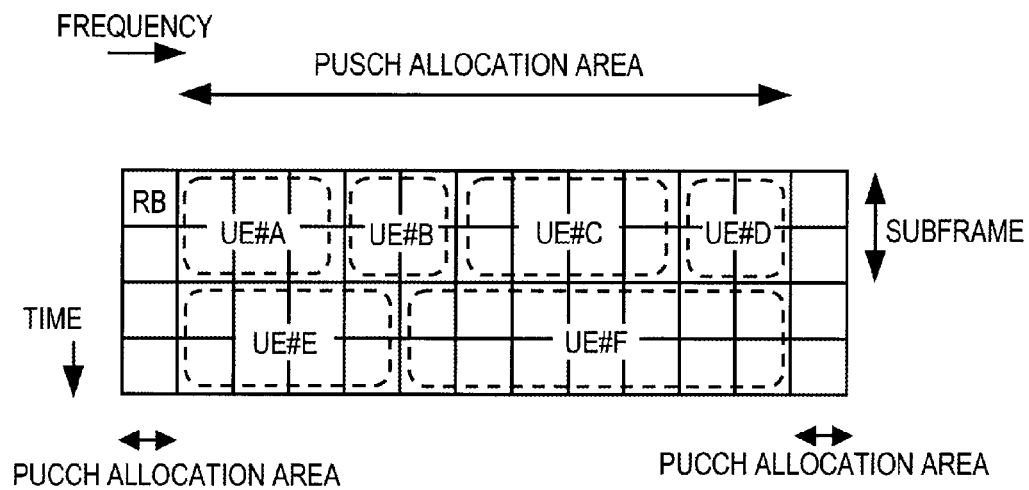
FIG. 20 is a view illustrating an allocation example of a radio frame in an uplink.
FIG. 21 is a view illustrating an example of a message transmitted and received between the base stations.

FIG. 20 is a view illustrating a configuration example of a radio frame in the uplink. FIG. 20, in which a horizontal axis is the frequency and a vertical axis is the time, illustrates an example of a PUSCH allocation area and a PUCCH allocation area. Incidentally, one frame illustrates a resource block (RB). One resource block is formed by, for example, 12 subcarriers in a frequency direction, and seven symbols in a time direction.

As illustrated in FIG. 20, the base station 100-2 can allocate a predetermined area of the PUSCH (for example, one or a plurality of resource blocks such as UE#A, UE#B and the like) as the radio resource to the terminal 200-1. The terminal 200-1 can transmit the data by using the allocated area. In addition, the base station 100-2 can determine the modulation and coding scheme (MCS) and the like at the time when the terminal 200-1 transmits the data. The base station 100-2 generates the scheduling information containing the radio resource allocation information, the modulation and coding scheme and the like, and generates the control signal containing the scheduling information.

With regard to the allocation of the radio resource to the terminal 200-1, the allocation of the radio resources of all of a plurality of carriers can be made by the base station 100-2, when the plurality of carriers (for example, carriers #3 to #5) are allocated to the base station 100-2. Further, the allocation of the radio resources of a part of the plurality of carriers can also be made to the terminal 200-1 by the base station 100-2.

Back to FIG. 18, the base station 100-2 uses the PDCCH priority carrier (carrier #4, for example) that is allocated to its own station, and transmits the control signal to the terminal 200-1 (S21). Similarly to the second embodiment, for example, the generation and the like of the scheduling information are made by the scheduler 104 (FIG. 4, for example), and the generation, transmission and the like of the control signal are made by the PDCCH transmission unit 107 and the like, for example.

When the terminal 200-1 can receive the control signal normally, it can transmit the data by using the predetermined area of the PUSCH that is allocated thereto. However, when the terminal 200-1 is unable to receive the control signal normally, it is unable to receive the allocation of the radio resource, and unable to transmit the data by using the predetermined area of the PUSCH allocated by the base station 100-2.

Meanwhile, when the terminal 200-1 can receive the control signal normally, the base station 100-2 can receive the data transmitted by the terminal 200-1 by using the predetermined area of the PUSCH allocated to the terminal 200-1. However, when the terminal 200-1 is unable to receive the control signal normally, the transmission is not made by the terminal 200-1 by using the allocated radio resource, and therefore, the base station 100-2 is unable to receive the data by using the allocated predetermined area of the PUSCH.

Given this situation, the base station 100-2 can determine whether the terminal 200-1 receives the control signal or not, by measuring the received power of the radio resource allocated to the terminal 200-1. For example, when the received power of the allocated area of the PUSCH is a certain level or more, the base station 100-2 can determine that the terminal 200-1 could receive the control signal normally, and when the received power is less than the certain level, the base station 100-2 can determine that the terminal 200-1 could not receive (did not receive) the control signal normally.

The reason why the terminal 200-1 is unable to receive the control signal normally may be because, for example, the terminal 200-1 is unable to receive a radio wave itself due to movement of the terminal 200-1 and the like. However, the reason is the interference of the control signal in most cases. For example, in the example of FIG. 18, the interference of the control signal is caused when the PDCCH priority carrier (carrier #4, for example) used for transmitting the control signal in the base station 100-2 and the PDCCH priority carrier used for transmitting the control signal in the base stations 100-1, 100-3, and the like are in agreement with each other.

According to the fourth embodiment, the base station 100-2 measures the received power of the predetermined area of the PUSCH that is allocated to the terminal 200-1 as the radio resource and, when the measured received power is a threshold value or less, determines that the interference with respect to the control signal is caused. Incidentally, as illustrated in FIG. 18 and the like, the base station 100-2 may determine that the interference is caused when the measured received power is the threshold value or less for n consecutive times (n is an integer equal to or more than 2), in consideration of instantaneous movement of the terminal 200-1. The latter example is explained in FIG. 18 and the like (S20-1 to S50). As noise may be detected in the received power, according to wireless environment, the threshold value may be a value that takes a noise level into consideration.

The operation example of the interference determination processing in the base station 100-2 will be explained by using FIG. 19. An explanation will be made simply to avoid overlaps with FIG. 18.

When the interference determination processing is started (S60), the base station 100-2 receives the scheduling request from the terminal 200 (UE#k) (It may be the terminal 200-1, for example. An explanation will be given by taking the terminal 200-1 as an example.) (S61).

Next, based on the scheduling request, the base station 100-2 allocates the predetermined area of the PUSCH to the terminal 200-1 as the radio resource (S62), and transmits the control signal containing the allocation information to the terminal 200-1.

Next, the base station 100-2 measures the received power of the allocated predetermined area of the PUSCH, and determines whether the measured received power becomes the threshold value or less or not (S63). For example, the interference detection unit 109 (FIG. 3, for example) receives information about the predetermined area of the PUSCH that is allocated to the terminal 200-1 from the scheduler 104, measures the received power of the area, and compares the received power with the threshold value held in the internal memory and the like, so as to determine whether the received power becomes the threshold value or less or not.

When the received power is the threshold value or less (Yes in S63), the base station 100-2 determines that the data is not able to be received from the terminal 200-1 by using the allocated radio resource, and increments a PUSCH non-reception counter by "1" (S64). The PUSCH non-reception counter is for counting the number of times when the data is not able to be received from the terminal 200-1, for example. For example, when the received power is the threshold value or less, the interference detection unit 109 increments the PUSCH non-reception counter that is held in its inside by "1".

Next, the base station 100-2 determines whether the PUSCH non-reception counter has the value of n or more or not (S65). For example, the interference detection unit 109 determines whether the count value of the non-reception counter that is held in its inside is the n times or more or not.

When the PUSCH non-reception counter has the value of less than n (No in S65), the processing moves to S60 and the above-described processing is repeated by the base station 100-2. In this case, the number of times when the received power is the threshold value or less does not reach the n consecutive times, and hence the base station 100-2 will wait for the reception of the scheduling request to be transmitted from the terminal 200-1.

Incidentally, when the terminal 200-1 is unable to receive the control signal after a lapse of a certain period of time, even after transmitting the scheduling request (S20 in FIG. 18), the terminal 200-1 can re-transmit the scheduling request (S20-1). In this case, if the number of times when the received power of the allocated area of the PUSCH is the threshold value or less does not reach the n times, the base station 100-2 transmits the control signal to the terminal 200-1 again (S62 in FIG. 19, S21-1 in FIG. 18).

Back to FIG. 19, when the value of the PUSCH non-reception counter is the n times or more (Yes in S65), the received power becomes the threshold value or less for the n consecutive times, and the base station 100-2 determines that the interference with regard to the transmission of the control signal is caused, and performs interference avoidance processing of the PDCCH (S66). The interference avoidance processing may be, for example, the same processing as the change processing of the PDCCH priority carrier according to the second embodiment (FIG. 13, for example). For example, the base station 100-2 can change the PDCCH priority carrier of its own station from the carrier #4 to the carrier #5.

Next, the base station 100-2 sets the PUSCH non-reception counter to be "0" (S67), and can finish the interference determination processing with respect to the terminal 200-1 (S68). Alternatively, after setting the PUSCH non-reception counter to be "0", the processing may shift to S60 again and the base station 100-2 may perform the interference determination processing of another terminal 200.

Meanwhile, when the received power in the allocated predetermined area of the PUSCH is not the threshold value or less (No in S63), the processing may shift to S60, and the base station 100-2 repeats the above-described processing. In this case, the base station 100-2 determines that the terminal 200-1 could receive the control signal normally, and is able to perform the processing from S60 so as to perform the interference determination processing to another terminal 200.

Fifth Embodiment

Next, a fifth embodiment will be explained. According to the second embodiment, the explanation was given to the example of exchanging the information about the PDCCH priority carrier between the plurality of base stations 100 that have the adjacent CA cells (S17 and S18 in FIG. 12, for example). According to the fifth embodiment, an example of exchanging the information about the PDCCH priority carrier by using an X2 interface will be explained.

The X2 interface is an interface used for exchanging information between the base stations 100, for example, and is standardized by 3GPP TS36.423 V10.3 (2011-9) and the like. Incidentally, the exchange of the PDCCH priority carriers by using the X2 interface is not defined by 3GPP TS36.423 V10.3 (2011-9) and the like. Therefore, the present inventor is decided to define a new message so that the PDCCH priority carriers can be exchanged between the base stations 100 by using the X2 interface.

First, the message will be explained by using FIG. 21 and FIG. 22, and then the example of exchanging the messages will be explained by using FIG. 23 and FIG. 24.

FIG. 21 is a view illustrating an example of the message that is used for transmitting the PDCCH priority carrier. The message contains respective areas of "Message Type" (as illustrated in FIG. 21), "Cell ID", "Center ID", "Center Frequency", "Bandwidth", and "PDCCH Priority". Incidentally, "Cell Information" contains respective areas of the "Cell ID", the "Center ID", the "Center Frequency", the "Bandwidth", and the "PDCCH Priority".

For example, information indicating a type of the message for exchanging the PDCCH priority carriers (a symbol, a code and the like) is inserted in the area of the "Message Type". The base station 100 can discriminate this message from other messages by the "Message Type".

A global cell ID is transmitted in the area of the "cell ID", for example.

Figure 22:
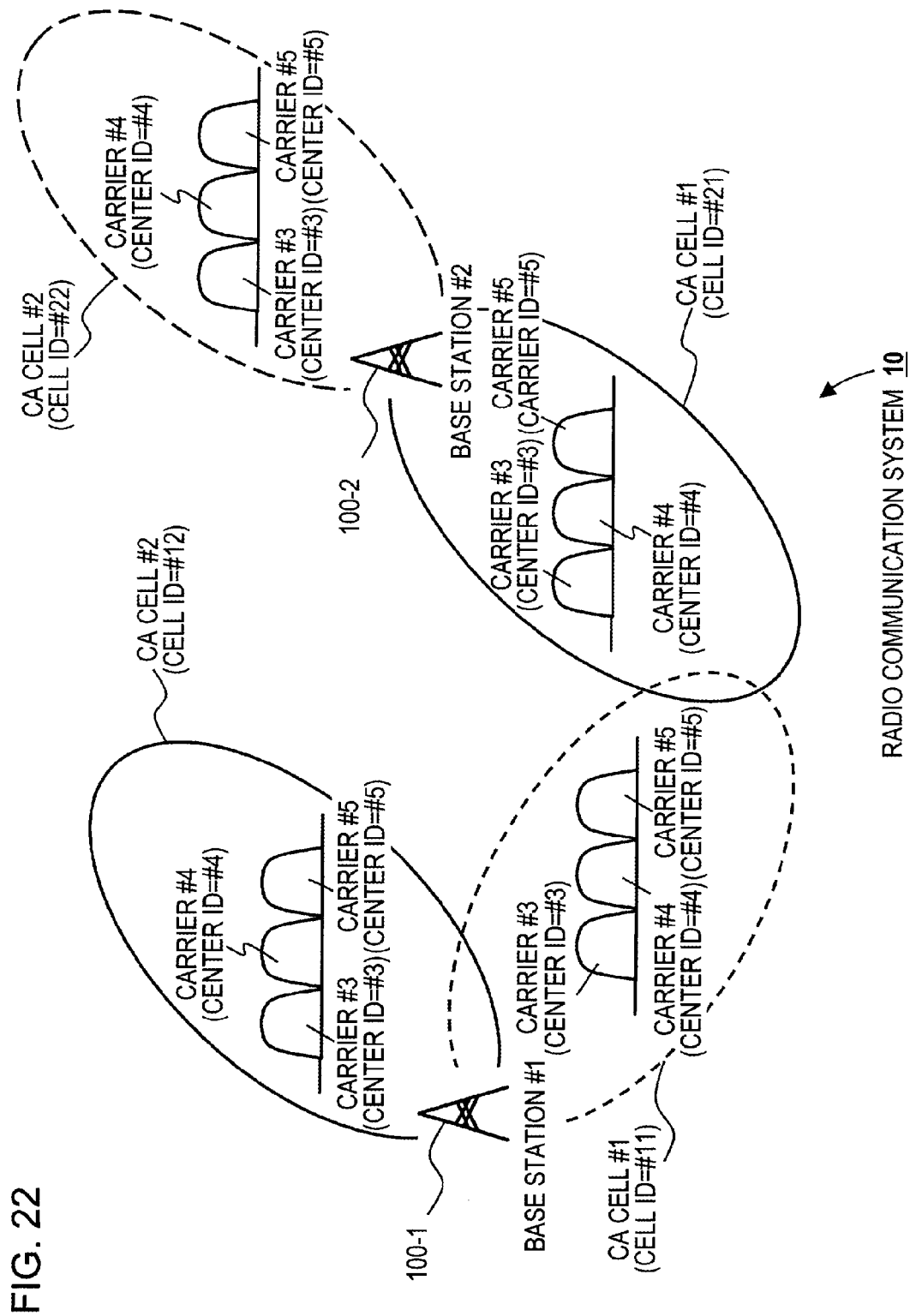
FIG. 22 is a view illustrating an example of relationship between cell IDs and center IDs.

FIG. 22 is a view illustrating an example of relationship of the cell IDs and the like. The global cell ID, used in the fifth embodiment, will be explained by using FIG. 22.

The global cell ID is an identifier that is given to the respective bound carriers aggregated in each of the CA cells, for example, and that is also used for identifying each of the CA cells in order to indicate which carriers are aggregated in each of the CA cells. In the example of FIG. 22, for example, the three carriers #3 to #5 are aggregated in the CA cell #1 of the base station 100-1, and a global cell ID=#11 is given to the bound carriers. Further, in the CA cell #2 of the base station 100-1, a global cell ID=#12 is given to the aggregated three carriers #3 to #5 that are bound to each other.

According to the second embodiment, for example, the "cell IDs" are used in the base stations 100-1 to 100-4, as illustrated in FIG. 7 and FIG. 8, so as to uniquely identify the respective carriers used in the base stations 100-1 to 100-4. However, the identifiers used as the "cell IDs" may use lower bits of the identifiers for identifying all the carriers used in all the base stations in some districts or in some countries, for example. When the lower bit is used, it is possible to reduce an amount of information, as compared with the case of transmitting all the bits, and to utilize the limited radio resources for transmitting the data and the like, at the time when the base station 100 transmits the identifier of the carrier to the terminal 200, for example.

However, when the lower bit is used, for example, the lower bit of the carrier #3 that is used in the CA cell #1 of the base station 100-1 and the lower bit of the carrier #3 that is used in the CA cell #1 of the base station 100-2 are in agreement with each other, and may be used as the same "cell ID". In this case, it may be difficult for the base stations 100-1 and 100-2 to identify the PDCCH priority carriers accurately, for example. Therefore, when the carriers are aggregated, the global cell ID is given to each aggregation of the bound carriers by the base station 100, and the "Center ID", instead of the "Cell ID", is given to each carrier so as to uniquely identify the carrier. Incidentally, according to the fifth embodiment, the global cell ID may be referred to as the "Cell ID", for example. In addition, the "Cell ID" explained in the second embodiment may be referred to as a "physical cell ID".

For example, in the example of FIG. 22, the "Cell ID" (=global cell ID) of "#11" is given to the CA cell #1 of the base station 100-1, and the "Center ID" of "#3" is given to the carrier #3 in the cell ID. Further, the "Cell ID" of "#21" is given to the CA cell #1 of the base station 100-2, and the "Center ID" of "#3" is given to the carrier #3 in the cell ID. The carrier having the "Center ID" of "#3" and the "global cell ID" of "#11" can be discriminated from the carrier having the "Center ID" of "#3" and the "global cell ID" of "#21" as the different carriers. Thus, each of the carriers can be uniquely identified by, for example, the "Cell ID" (=global cell ID) and the "Center ID".

Back to FIG. 21, in the area of the "Cell ID", the "cell IDs", by the number of the given global cell IDs, can be exchanged between the base stations 100. For example, in the example of FIG. 22, the base station 100-1 can transmit information from the "Center ID" to the "PDCCH priority" with regard to the "cell ID=#2", and information from the "Center ID" to the "PDCCH priority" with regard to the "cell ID=#3".

The ID of each carrier can be inserted in the area of the "Center ID". As illustrated in FIG. 22, for example, the "Center ID" such as "#3" to the carrier #3 or "#4" to the carrier #4 is given, in the base stations 100-1 and 100-2, and the Center ID is inserted in the area of the "Center ID" of this message and transmitted.

The center frequency of each carrier can be inserted in the area of the "Center Frequency", for example. It is also possible for the base station 100 to exactly identify each of the carriers by the "Cell ID" and the "Center Frequency", for example.

In the area of the "Bandwidth", for example, the bandwidth of each of the carriers can be inserted. Incidentally, the area of the "Bandwidth" may be inserted in this message, or may be an optional area ("0" (Option) in "Presence") that is not to be inserted. Incidentally, the remaining areas may be mandatory areas ("M" (Mandatory)) in this message, for example.

A degree of priority with respect to the PDCCH priority carrier can be inserted in the "PDCCH priority", for example. For example, various kinds of information can be inserted in the areas from the "Center ID" to the "PDCCH priority", for each of the carriers. For example, in the example of FIG. 22, it is possible to insert the information from the "Center ID" to the "PDCCH priority" with regard to the carrier #3 of the "cell ID=#11" of the base station 100-1, and to insert the information from the "Center ID" to the "PDCCH priority" with regard to the carrier #4. When the PDCCH priority carrier of the base station 100-1 is the carrier #4, for example, the "PDCCH priority" of the carrier #4 can be set to have a higher degree of priority than the "PDCCH priority" of other carriers. For example, the base station 100-1 can set the "PDCCH priority" of the carriers #3 and #5 to be "0", and the "PDCCH priority" of the carrier #4 to be "1". Alternatively, the base station 100-1 can set the "PDCCH priority" of the carrier #3 to be "1", the "PDCCH priority" of the carrier #4 to be "3", and the "PDCCH priority" of the carrier #2 to be "2", so as to set the carrier #4 as the PDCCH priority carrier. Upon receipt of such notification, it is possible for another base station 100 to recognize that the carrier #4 is used as the PDCCH priority carrier in the base station 100 and, when detecting the interference with regard to the transmission of the control signal, to change the carrier to the carrier #3 with the lowest "PDCCH priority", for example. Alternatively, it is also possible for another base station 100 to change the carrier to the carrier #5 with the second lowest "PDCCH priority", not to the carrier #3 with the lowest "PDCCH priority". The base station 100 can change the PDCCH priority carrier according to the "PDCCH priority".

Thus, the base station 100 can notify other base stations of the number of the PDCCH priority carrier to be used by its own station, by transmitting this message, for example. Further, the base station 100 can notify other base stations of the numbers of the carriers aggregated in its own station by the "Global Cell ID" and the "Center ID" (or the "Center Frequency") in this message, for example.

Incidentally, the "Cell ID" (=Global Cell ID), the "Center ID", the "Center Frequency" and the "Bandwidth" may be allocated at the time of installing the base station 100, for example. Alternatively, such information may be notified from the higher-level apparatus after installing the base station 100, for example. The base station 100 may hold the allocated or notified information, from the "Cell ID" to the "Bandwidth", in the table 106 (or the table 108, 112).

Next, an example of transmitting the message will be explained. FIG. 23 and FIG. 24 are sequence charts illustrating examples of transmitting the message from the base station 100-2 to the base station 100-4. FIG. 23 illustrates the example in which functions of the base stations 100-2 and 100-4 are not checked by each other, and FIG. 24 illustrates the example in which the functions are checked by each other.

Figure 23:
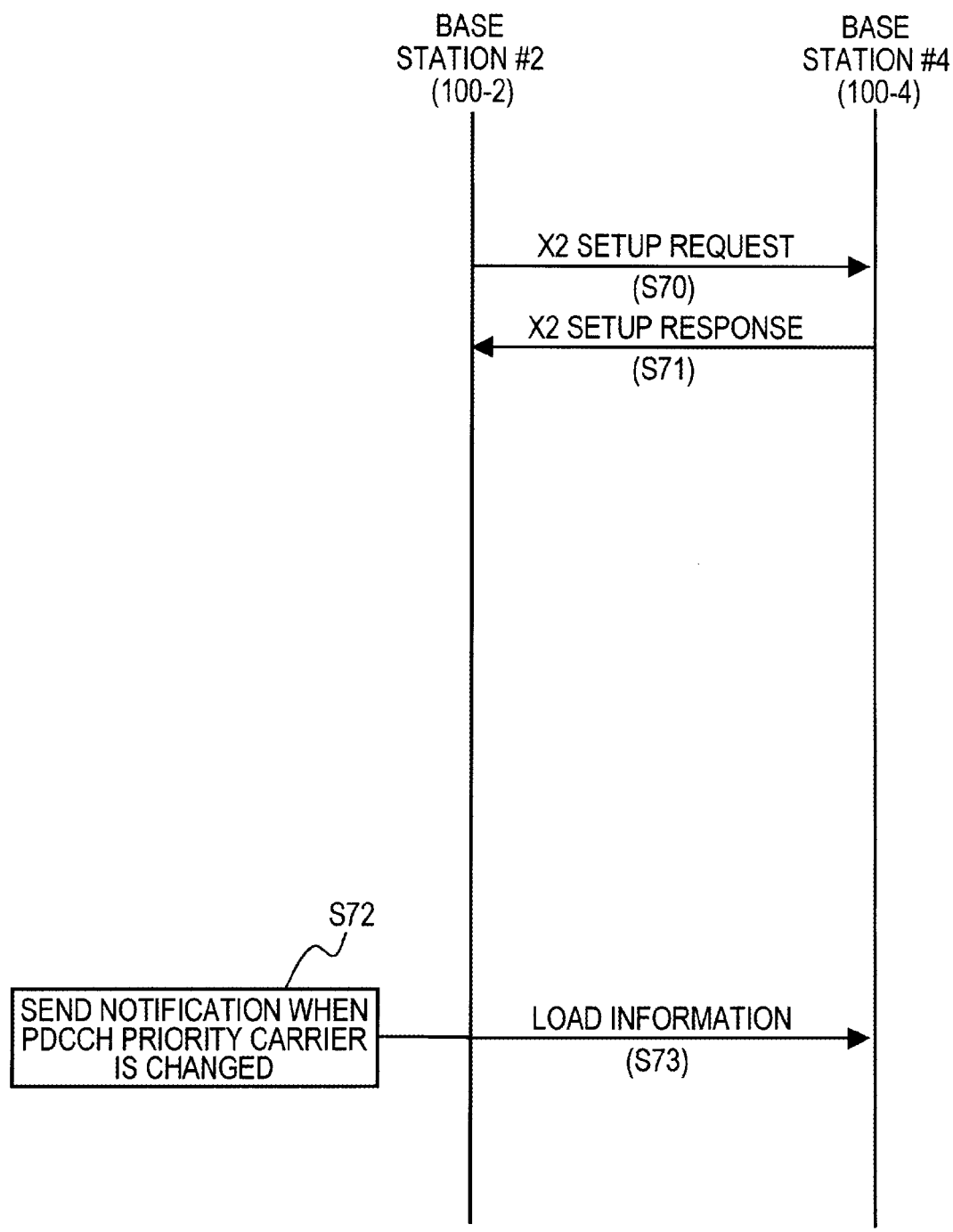
FIG. 23 is a sequence chart illustrating an example of exchanging the message.
Figure 24:
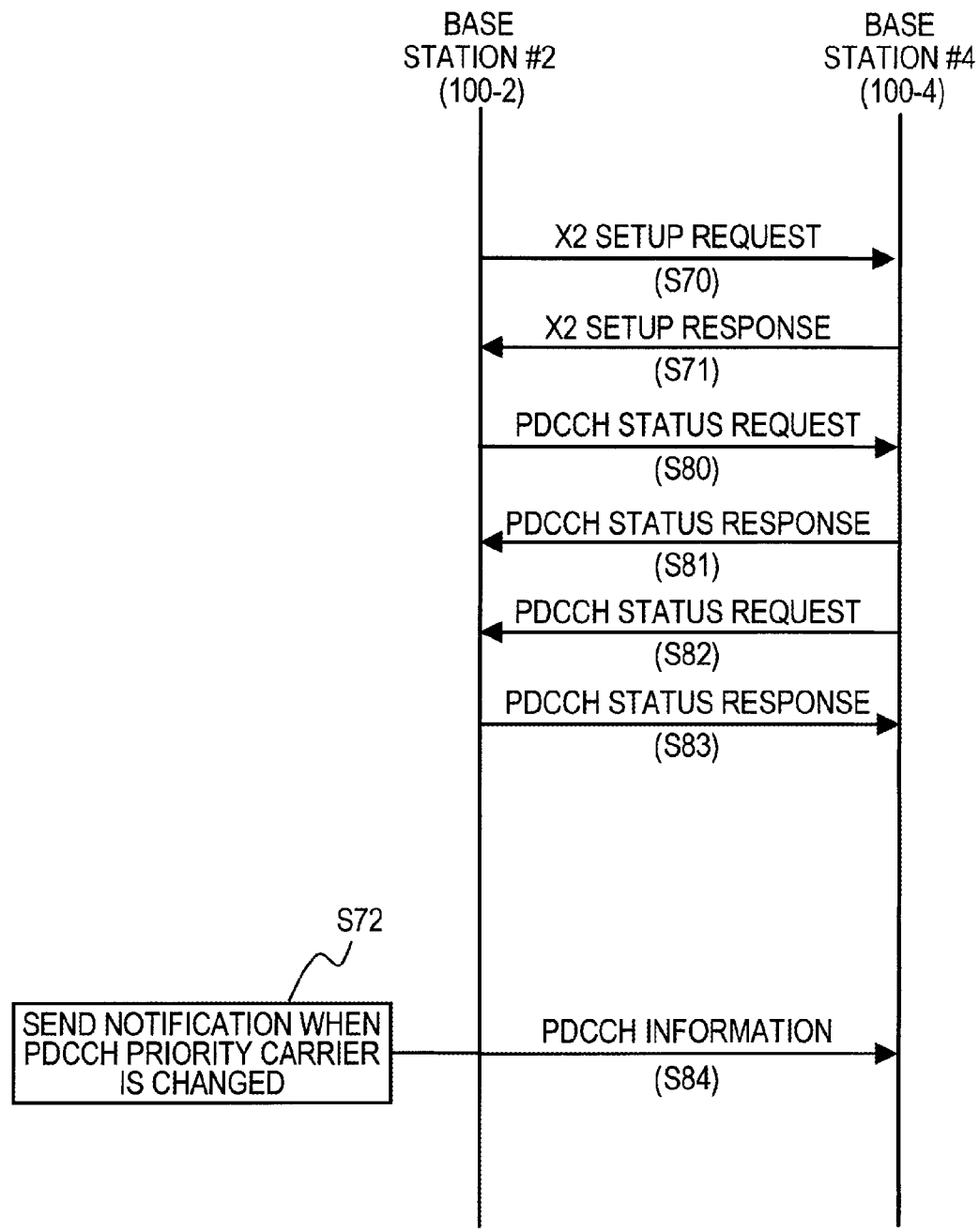
FIG. 24 is a sequence chart illustrating an example of exchanging the message.

Specifically, the base station 100-2 transmits an "X2 setup Request" to the base station 100-4 (S70), and the base station 100-4 transmits an "X2 setup Response" back to the base station 100-2 (S71) in both of FIG. 23 and FIG. 24. Thus, X2 setup procedures are started between the two base stations 100-2 and 100-4, for example.

In the example of FIG. 23, the message can be transmitted (S73) when the PDCCH priority carrier is changed in the base station 100-2 after that (S72). Similarly to the second embodiment, for example, the instruction to generate the message can be given to the adjacent cell information collection unit 111, when the PDCCH selection unit 113 (FIG. 4, for example) detects the change or the addition of the entry to the priority PDCCH management table 106.

At this time, the PDCCH selection unit 113 can read out the "Carrier ID", the "cell ID" (=physical cell ID), and the "PDCCH priority carrier" of its own station, from the priority PDCCH management table 106, for example (FIG. 6, for example). Then, the PDCCH selection unit 113 gains access to the table 106 (or another table 108, 112), and reads out the "Cell ID" (=global cell ID), the "Center ID", the "Center Frequency" and the "Bandwidth" that correspond to the "Carrier ID" and the like read out from the priority PDCCH management table 106. Further, it is also possible for the PDCCH selection unit 113 to calculate the corresponding "PDCCH priority" from the "PDCCH priority carrier". For example, the one with the highest degree of priority can be allocated to the "Center ID", as the carrier number of the PDCCH priority carrier of its own station. The PDCCH selection unit 113 can output the information from the "Cell ID" to the "PDCCH priority" to the adjacent cell information collection unit 111, and the adjacent cell information collection unit 111, receiving this information, can generate the message as illustrated in FIG. 21.

In the example of FIG. 23, this message is transmitted as "Load Information". This can also be transmitted as the message as illustrated in FIG. 21, for example. There is a possibility that this message is not supported by the base station 100-4. In this case, however, the base station 100-4 can receive the information, other than the "PDCCH priority", as the "Load Information", although the "PDCCH priority" in the message may be ignored. Thus, it is possible for the base station 100-4 to recognize the numbers of the carriers that are used in the base station 100-2, for example.

Meanwhile, in the example of FIG. 24, the functions of the base stations 100-2 and 100-4 are checked by each other (S80 to S83), and, for example, whether the transmission/reception of the message can be made via the X2 interface or not can be checked by each other. In this case, it is also possible for the base station 100-2 to transmit this message when the PDCCH priority carrier is changed or when the entry is added to the priority PDCCH management table 106 (S84).

For example, when the adjacent cell information collection unit 111 of the base station 100-4 receives the message containing the PDCCH priority carrier via the Ethernet (registered trademark) signal transmission and reception unit 110, it can extract the information from the "Cell ID" to the "PDCCH priority" contained in the message. Then, based on the "PDCCH priority", the adjacent cell information collection unit 111 can extract the number of the PDCCH priority carrier of the base station 100-2, and notify the PDCCH selection unit 113 of the number. Upon receiving the PDCCH priority carrier of the base station 100-2, the PDCCH selection unit 113 can store the information in the priority PDCCH management table 106. Alternatively, the adjacent cell information collection unit 111 notifies the PDCCH selection unit 113 of all the information extracted from the received message, including the "Cell ID" and the like, for example, and, based on the "PDCCH priority" in the information, the PDCCH selection unit 113 can extract the number of the PDCCH priority carrier of the base station 100-2.

In the example of FIG. 24, the base station 100-4, receiving the notification of the message, can recognize the number of the PDCCH priority carrier after the change in the base station 100-2. Further, by using the message, the base station 100-4 can also recognize the numbers of the carriers used in the base station 100-2.

Incidentally, the processing, operation and the like explained in the fourth and fifth embodiments can be implemented in the third embodiment, for example. For example, the CPU 150 and the DSP 152 of the base station 100, as illustrated in FIG. 17A, correspond to the scheduler 104, the interference detection unit 109, the adjacent cell information collection unit 111, and the PDCCH selection unit 113, and the memory 151 corresponds to the priority PDCCH management table 106. Thus, the processing and operation by the interference detection unit 109, the adjacent cell information collection unit 111, and the PDCCH selection unit 113, as explained in the fourth and the fifth embodiments, can be performed by the CPU 150 and the DSP 152.

It is possible to provide a radio base station apparatus, a radio communication method in the radio base station apparatus, and a radio communication system capable of avoiding an interference, and of enabling the radio communication of the terminal.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

10: Radio communication system
100, 100-1 to 100-4: Radio base station apparatus (Base station)
101: Radio signal transmission and reception unit
102: RS signal generation unit
104: Scheduler
105: Measurement report reception unit
106: Priority PDCCH management table (Multi-use priority PDCCH management table)
107: PDCCH transmission unit
108: Terminal management table
109: Interference detection unit
110: Ethernet (registered trademark) signal transmission and reception unit
111: Adjacent cell information collecting unit
112: Adjacent information table
113: PDCCH selection unit
200, 200-1 to 200-3: Terminal apparatus
202: RSRP measuring unit
203: Measurement report transmission unit
204: SR processing unit

The invention claimed is:

1. A radio base station apparatus for performing radio communication with a terminal apparatus by using a first and second radio frequency bands at a same time, the radio base station apparatus comprising:
   a change unit which changes a radio frequency band for transmitting a first control signal from the first radio frequency band to the second radio frequency band, when the change unit detects interference with respect to the first control signal transmitted to the terminal apparatus; and
   a transmission unit which transmits the first control signal by using the second radio frequency band.

2. The radio base station apparatus according to claim 1, wherein the change unit changes the first radio frequency band to the second radio frequency band, when another radio base station apparatus transmits a second control signal by using the first radio frequency.

3. The radio base station apparatus according to claim 2, further comprising a collecting unit which collects from the other radio base station apparatus the radio frequency band used for transmitting the second control signal in the other radio base station apparatus, wherein
   the change unit changes the radio frequency band for transmitting the first control signal based on the radio frequency band collected by the collecting unit.

4. The radio base station apparatus according to claim 1, wherein the change unit changes the radio frequency band for transmitting the first control signal to the first radio frequency band, when the other radio base station apparatus transmits the second control signal by using the second radio frequency band.

5. The radio base station apparatus according to claim 1, wherein
   the radio base station apparatus performs the radio communication by using a plurality of radio frequency bands including the first and second radio frequency bands, and
   the change unit uses the radio frequency band not used for transmitting a second control signal in another radio base station apparatus, out of the plurality of radio frequency bands, as the second radio frequency band for transmitting the first control signal.

6. The radio base station apparatus according to claim 1, wherein
   the radio base station apparatus performs the radio communication by using a plurality of radio frequency bands including the first and second radio frequency bands, and
   the change unit uses the radio frequency band with the least interference, out of the plurality of radio frequency bands other than the first radio frequency band, as the second radio frequency band for transmitting the first control signal, when there are a plurality of other radio base station apparatuses and all the plurality of radio frequency bands are used by the plurality of other radio base station apparatuses for transmitting a second control signal.

7. The radio base station apparatus according to claim 1, wherein the change unit changes to the second radio frequency band when the terminal apparatus detected the interference is located within a threshold distance from a boundary of a radio wave reachable range of the radio base station apparatus, and uses the radio frequency band for transmitting the first control signal as the first radio frequency band when the terminal apparatus is located a place other than the threshold distance from boundary and within the radio wave reachable range.

8. The radio base station apparatus according to claim 1, wherein
   the radio base station apparatus performs the radio communication by using a plurality of radio frequency bands including the first and second radio frequency bands, and
   the change unit changes to the second frequency band with respect to all the subordinate terminal apparatuses when changes the radio frequency band for transmitting the first control signal to the second frequency band, and changes the radio frequency band for transmitting the first control signal from the second frequency band to a third radio frequency band with respect to the terminal apparatus, when the change unit detects the interference with respect to the first control signal transmitted to the terminal apparatus by using the second frequency band.

9. The radio base station apparatus according to claim 1, wherein the change unit detects that the interference is caused, when the change unit transmits the first control signal corresponding to a scheduling request transmitted from the terminal apparatus and does not receive a radio signal corresponding to the first control signal within a threshold period.

10. The radio base station apparatus according to claim 9, wherein the first control signal corresponding to the scheduling request includes information with respect to a radio resource when the terminal apparatus transmits the radio signal.

11. The radio base station apparatus according to claim 1, wherein the change unit detects that the interference is not caused, when the change unit transmits the first control signal corresponding to a scheduling request transmitted from the terminal apparatus and receives a radio signal corresponding to the first control signal within a threshold period.

12. A radio communication method in a radio base station apparatus for performing radio communication with a terminal apparatus by using a first and second radio frequency bands at a same time, the method comprising:
   changing a radio frequency band for transmitting a first control signal from the first radio frequency band to the second radio frequency band, on detecting interference with respect to the first control signal transmitted to the terminal apparatus, by a change unit; and
   transmitting the first control signal by using the second radio frequency band, by a transmission unit.

13. A radio communication system comprising:
a radio base station apparatus; and
a terminal apparatus, wherein
radio communication is performed between the radio base station apparatus and the terminal apparatus by using a first and second radio frequency bands at a same time,
the radio base station apparatus includes:
a change unit which changes a radio frequency band for transmitting a first control signal from the first radio frequency band to the second radio frequency band, when the change unit detects interference with respect to the first control signal transmitted to the terminal apparatus; and
a transmission unit which transmits the first control signal by using the second radio frequency band, and
the terminal apparatus includes a reception unit which receives the first control signal by using the second radio frequency band.

* * * * *